(12) United States Patent
Romanin et al.

(10) Patent No.: US 10,845,133 B2
(45) Date of Patent: Nov. 24, 2020

(54) CONFORMABLE HEAT EXCHANGER SYSTEM AND METHOD

(71) Applicant: Other Lab, LLC, San Francisco, CA (US)

(72) Inventors: Vincent Domenic Romanin, San Francisco, CA (US); Adrien Benusiglio, San Francisco, CA (US); Peter Sturt Lynn, Alameda, CA (US); Saul Thomas Griffith, San Francisco, CA (US); Adam Rutkowski, San Francisco, CA (US)

(73) Assignee: Other Lab, LLC, San Francisco, CA (US)

( * ) Notice: Subject to any disclaimer, the term of this patent is extended or adjusted under 35 U.S.C. 154(b) by 55 days.

(21) Appl. No.: 16/156,364

(22) Filed: Oct. 10, 2018

(65) Prior Publication Data

US 2019/0107338 A1    Apr. 11, 2019

Related U.S. Application Data

(60) Provisional application No. 62/570,548, filed on Oct. 10, 2017.

(51) Int. Cl.
*F28F 3/12* (2006.01)
*F28F 21/06* (2006.01)
(Continued)

(52) U.S. Cl.
CPC ............. *F28F 3/12* (2013.01); *F28D 1/0308* (2013.01); *F28D 1/0477* (2013.01); *F28D 7/10* (2013.01);
(Continued)

(58) Field of Classification Search
CPC ......... Y10T 29/49366; F28F 3/12; F28F 3/14; F28D 1/0325; F28D 1/0333; F28D 1/0358; B23P 15/26
See application file for complete search history.

(56) References Cited

U.S. PATENT DOCUMENTS 1,183,077 A   5/1916 Koenig
1,926,463 A   9/1933 Stoddard
(Continued)

FOREIGN PATENT DOCUMENTS

CA   2338240 A1   12/2000
EP   0052321 A1   5/1982
(Continued)

OTHER PUBLICATIONS

"APTIV® Victrex® Peek Film Technology: High Performance Film for Unmatched Versatility and Performance," Victrex Polymer Solutions, brochure first published 2012, last modified 2014.
(Continued)

*Primary Examiner* — Jason L Vaughan
(74) *Attorney, Agent, or Firm* — Davis Wright Tremaine LLP

(57) ABSTRACT

A membrane heat exchanger comprising a first planar sheet and a second planar sheet coupled to the first planar sheet to form at least one fluid chamber defined by the first and second sheets and a first and second end that respectively communicate with a first and second port defined by at least one of the first and second sheet.

12 Claims, 10 Drawing Sheets

(51) Int. Cl.
*F28D 9/00* (2006.01)
*F28D 1/03* (2006.01)
*F28D 7/10* (2006.01)
*F28D 1/047* (2006.01)
*B23P 15/26* (2006.01)
*F28F 3/04* (2006.01)
*F28F 3/14* (2006.01)
*F28D 21/00* (2006.01)

(52) U.S. Cl.
CPC .......... *F28D 9/0087* (2013.01); *F28F 21/062* (2013.01); *F28F 21/065* (2013.01); *B23P 15/26* (2013.01); *F28D 1/035* (2013.01); *F28D 1/0325* (2013.01); *F28D 1/0341* (2013.01); *F28D 2021/0063* (2013.01); *F28F 3/044* (2013.01); *F28F 3/14* (2013.01); *F28F 2255/02* (2013.01); *F28F 2275/06* (2013.01); *Y10T 29/49366* (2015.01)

(56) References Cited

U.S. PATENT DOCUMENTS

| | | |
|---|---|---|
| 2,252,064 A | 8/1941 | Cornell, Jr. |
| 3,530,681 A | 9/1970 | Dehne |
| 3,537,935 A * | 11/1970 | Withers ................ F28D 7/0025 156/382 |
| 3,751,904 A | 8/1973 | Rydberg |
| 3,827,675 A | 8/1974 | Schuman |
| 3,862,546 A | 1/1975 | Daniels |
| 3,986,360 A | 10/1976 | Hagen et al. |
| 4,242,878 A | 1/1981 | Brinkerhoff |
| 4,377,203 A | 3/1983 | Ejima |
| 4,411,310 A | 10/1983 | Perry et al. |
| 4,455,825 A | 6/1984 | Pinto |
| 4,490,974 A | 1/1985 | Colgate |
| 4,619,112 A | 10/1986 | Colgate |
| 4,859,265 A | 8/1989 | Shuster et al. |
| 4,955,435 A | 9/1990 | Shuster et al. |
| 5,138,765 A * | 8/1992 | Watson ................ B21D 53/045 29/457 |
| 5,195,240 A | 3/1993 | Shuster et al. |
| 5,337,563 A | 8/1994 | Weber |
| 5,813,235 A | 9/1998 | Peterson |
| 5,954,125 A | 9/1999 | Mantegazza et al. |
| 6,332,323 B1 | 12/2001 | Reid et al. |
| 6,857,468 B2 | 2/2005 | Emrich |
| 7,140,107 B2 * | 11/2006 | Ohno .................... F28D 1/0333 29/890.039 |
| 7,143,823 B2 * | 12/2006 | Kang .................... F28D 1/0308 165/170 |
| 7,198,093 B1 * | 4/2007 | Elkins ...................... A61F 7/02 165/170 |
| 7,243,703 B2 * | 7/2007 | Yamaguchi ............... F28F 3/14 165/41 |
| 7,467,467 B2 * | 12/2008 | Prociw ................... B22F 7/004 29/890.03 |
| 7,802,426 B2 | 9/2010 | Bollinger |
| 8,061,411 B2 | 11/2011 | Xu et al. |
| 8,650,886 B2 * | 2/2014 | Wilcoxon ............... F04B 17/00 62/3.2 |
| 8,967,239 B2 | 3/2015 | Schertz et al. |
| 9,140,273 B2 | 9/2015 | Stroganov |
| 9,234,480 B2 | 1/2016 | Gayton |
| 9,648,983 B2 * | 5/2017 | Hofer .................... A47J 31/542 |
| 2004/0003915 A1 | 1/2004 | Shippy et al. |
| 2004/0050532 A1 | 3/2004 | Yamaguchi et al. |
| 2005/0092474 A1 | 5/2005 | Seidel |
| 2014/0007569 A1 | 1/2014 | Gayton |
| 2015/0323260 A1 * | 11/2015 | Greber ...................... F28D 9/04 165/164 |
| 2016/0231071 A1 * | 8/2016 | Sekol .................... F28F 21/062 |
| 2017/0205146 A1 * | 7/2017 | Turney .................. F28D 7/0033 |
| 2018/0283794 A1 * | 10/2018 | Cerny .................... F28F 9/0268 |
| 2018/0283795 A1 * | 10/2018 | Cerny ..................... F01D 25/12 |

FOREIGN PATENT DOCUMENTS

| | | |
|---|---|---|
| EP | 1779965 B1 | 9/2012 |
| FR | 2848653 A1 | 6/2004 |
| RU | 2100733 C1 | 12/1997 |
| RU | 2413152 C2 | 2/2011 |
| RU | 2487270 C2 | 7/2013 |
| UA | 88281 U | 3/2014 |
| WO | 2006134716 A1 | 12/2006 |
| WO | 2007144498 A2 | 12/2007 |
| WO | 2008108724 A3 | 11/2008 |

OTHER PUBLICATIONS

Denkenberger et al., "Expanded microchannel heat exchanger: design, fabrication and preliminary experimental test," Proceedings of the Institution of Mechanical Engineers—Part A: Journal of Power and Energy 226(4):532-544 , Apr. 11, 2012.

International Search Report and Written Opinion dated Dec. 13, 2018, International Patent Application No. PCT/US2018/055294, filed Oct. 10, 2018, 6 pages.

International Search Report and Written Opinion dated Sep. 1, 2016, International Patent Application No. PCT/US2016/033659, filed May 20, 2016.

International Search Report and Written Opinion dated Sep. 15, 2016, International Patent Application No. PCT/US2016/033655, filed May 20, 2016.

Scheffler et al., "Fabrication of polymer film heat transfer elements for energy efficient multi-effect distillation," Desalination 222(1-3):696-710, Mar. 1, 2008.

Zaheed et al., "Review of polymer compact heat exchangers, with special emphasis on a polymer film unit," Applied Thermal Engineering 24(16):2323-2358, published online Jun. 2, 2004, print publication Nov. 30, 2004.

International Search Report and Written Opinion dated May 28, 2020, International Patent Application No. PCT/US2020/015463, filed Jan. 28, 2020, 6 pages.

* cited by examiner

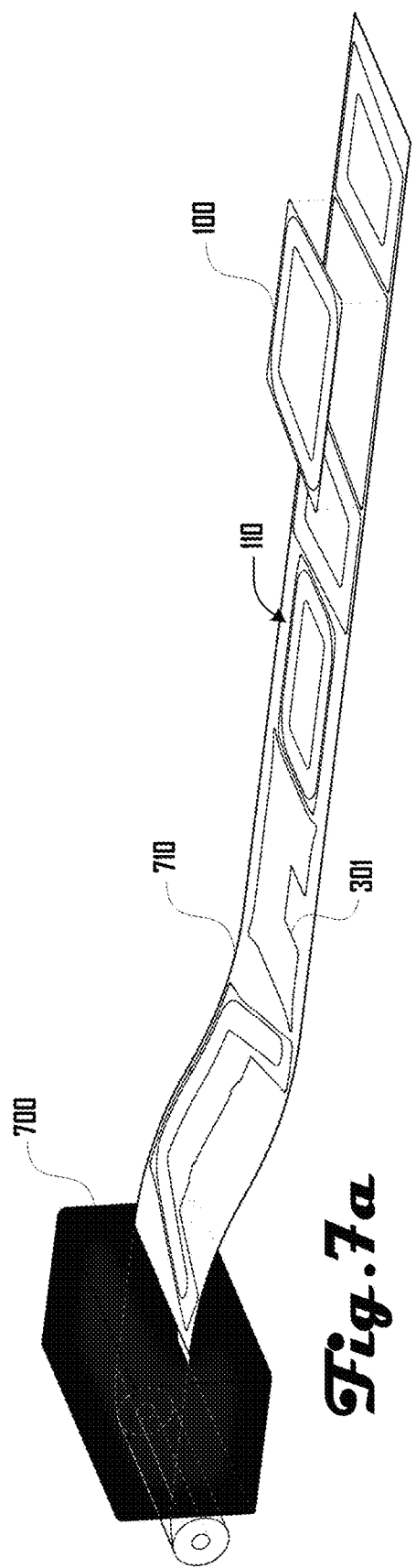
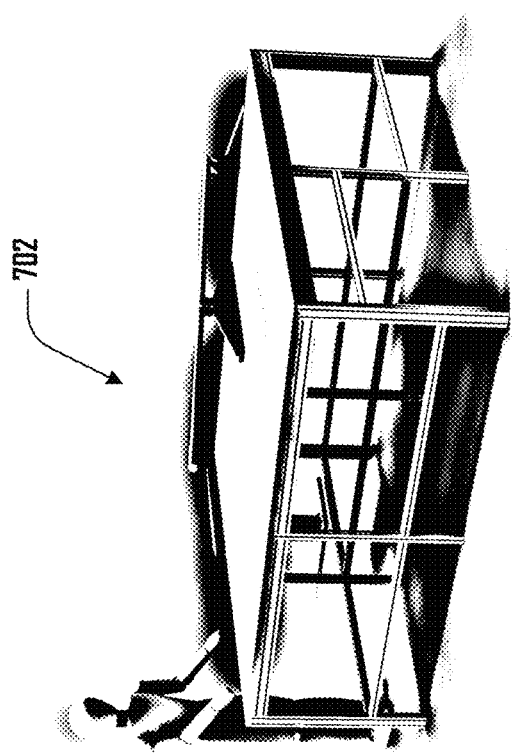
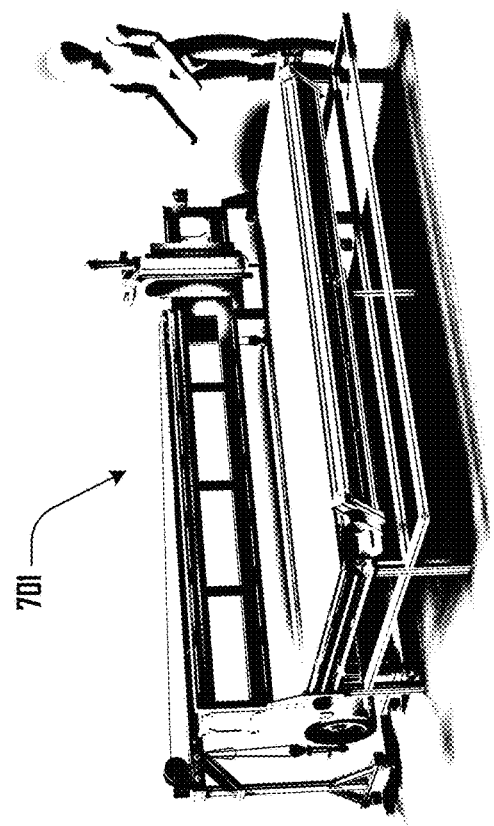
Fig. 7a
Fig. 7b
Fig. 7c

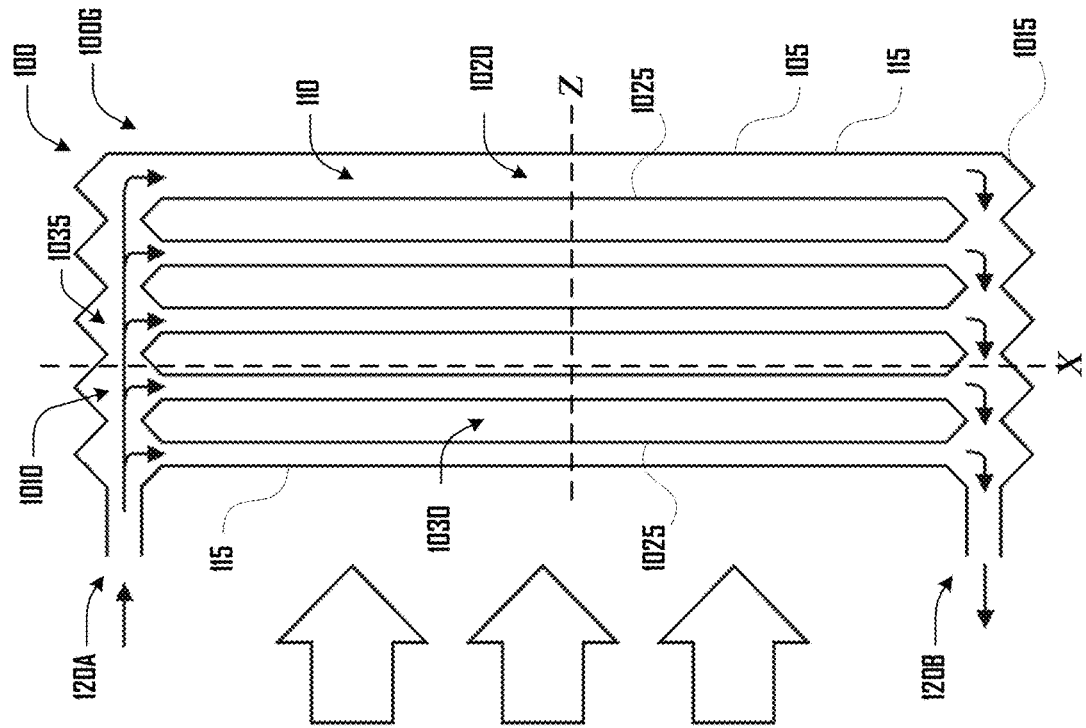
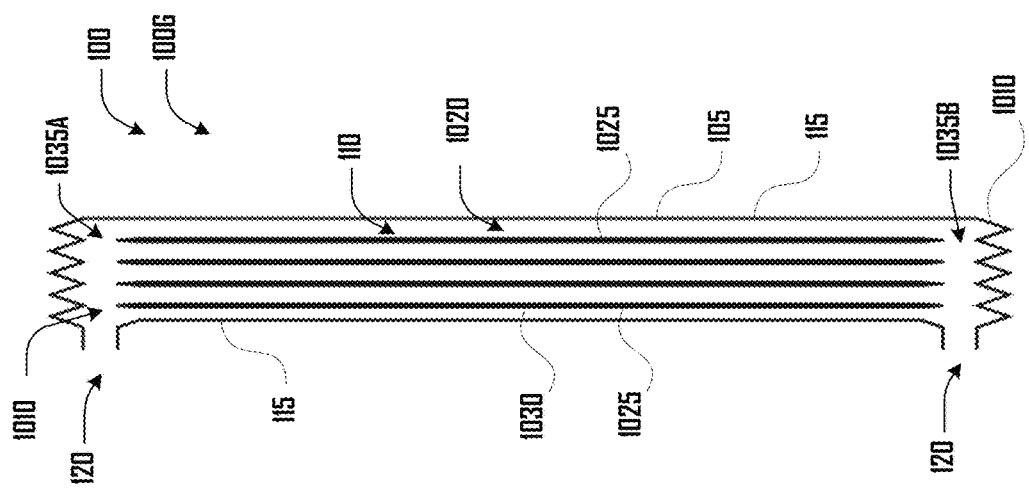

CONFORMABLE HEAT EXCHANGER SYSTEM AND METHOD

CROSS-REFERENCE TO RELATED APPLICATIONS

This application is a non-provisional of and claims priority to U.S. Provisional Application No. 62/570,548, filed Oct. 10, 2017, entitled "SHAPE-SHIFTING HEAT EXCHANGERS" which application is hereby incorporated herein by reference in its entirety and for all purposes.

This application is also related to U.S. application Ser. No. 15/161,029 filed May 20, 2016 entitled "Membrane Heat Exchanger System And Method" and U.S. application Ser. No. 15/161,064 filed May 20, 2016 entitled "Near-isothermal compressor/expander." These applications are hereby incorporated herein by reference in their entirety and for all purposes.

BACKGROUND

Conventional heat exchangers are made from the assembly of one or more rigid tubes or channels, where one fluid flows over, around, or outside of the tubes/channels and another fluid flows inside. The purpose of such tubes/channels is to facilitate heat transfer from one fluid to the other. Common types of heat exchangers include shell-and-tube, plate, tube-fin, microchannel-fin, and pillow plate heat exchangers. In nearly all of these common types, the physical shape and configuration is partially or completely determined by the construction method of the heat exchanger. For example, cylinders are common for shell-and-tube heat exchangers and boxes are common for most other types. Furthermore, the shape and size of the heat exchanger are fixed after manufacture, and cannot change during installation or operation.

Conventional fin-and-tube heat exchangers, (e.g., car radiators), are highly constrained in geometric layout and do not fit well into confined volumes of arbitrary shape. The result of this is that systems which use conventional heat exchangers require such heat exchangers to be specifically designed to accommodate physical shape requirements of the system. If heat exchangers were able to change in size or adapt to different sizes and shapes, the configurations of systems that use heat exchangers would have more design flexibility and, consequently, more opportunities for performance improvement. Accordingly, there is a need for flexible heat exchanger systems that provide for improved design flexibility and opportunities for performance improvement.

In various embodiments, the temperature difference $\Delta T$ across a heat exchanger directly equates to a loss in exergy. After accounting for the $\Delta T$ across a heat exchanger, the Carnot coefficients of performance for heat pumps in cooling and heating systems become:

$$COP_{cooling} = \frac{T_c - \Delta T}{(T_h + \Delta T) - (T_c - \Delta T)} \quad (1)$$

$$COP_{heating} = \frac{T_h + \Delta T}{(T_h + \Delta T) - (T_c - \Delta T)}$$

where $T_h$ and $T_c$ are hot and cold temperatures at either end of the system and $\Delta T$ is the additional temperature difference required to transfer heat to the air through a heat exchanger. However, $\Delta T$ is constrained by the need to exchange heat at a sufficient rate; this heat flux from one fluid, through a wall, into a second fluid is a function of the combined heat transfer due to convection in both fluids and conduction and is given by $$Q = h_1 A \Delta T_1 \quad (3)$$
$$Q = h_2 A \Delta T_2$$
$$Q = \frac{kA\Delta T_3}{t} \Rightarrow Q = \frac{A\Delta T}{\frac{1}{h_1} + \frac{1}{h_2} + \frac{t}{k}}$$

where A is the surface area of the heat exchanger, t is the wall thickness, k is the thermal conductivity of the material, $h_1$ and $h_2$ are the heat transfer coefficients of either fluid, and Q is the heat transfer.

Power plants and other implementations are similarly limited by heat exchanger $\Delta T$ via the Carnot efficiency $$\eta = \frac{T_h - (T_c + \Delta T)}{T_h} \quad (3)$$

In various embodiments, laminar flow heat transfer and flow losses are approximated by $$Q = \frac{NukA\Delta T}{d} \quad (4)$$

$$P_{fan} = \frac{8A\mu v^2}{d}$$

where Nu is the Nusselt number, d is the effective tube diameter, $P_{fan}$ is the required fan power, $\mu$ is the viscosity, and v is the fluid velocity.

The heat transfer rate in a heat exchanger can be directly proportional to the surface area in the heat exchanger. Increasing the surface area can increase the overall heat transfer, thereby increasing performance. This can be impractical with conventional heavy metallic heat exchangers. Additionally, conventional metallic heat exchangers become fragile and corrosion sensitive at small thicknesses.

Metallic fin-and-tube heat exchangers, similar to automotive radiators, are the current standard for conventional heat exchangers. Most metals have high densities and become fragile and corrosion sensitive at thin film thicknesses. Thus, metallic heat exchangers are heavier and more expensive than otherwise required for a given operating pressure or desired heat transfer rate and typically rely on high-power fans which reduce efficiency.

In view of the foregoing, a need exists for improved membrane heat exchanger systems and methods in an effort to overcome the aforementioned obstacles and deficiencies of conventional systems.

BRIEF DESCRIPTION OF THE DRAWINGS

FIG. 7a illustrates an example embodiment of a printer configured for roll-to-roll printing of fluidic chambers.

FIG. 7b illustrates an embodiment of a full roll laser welder.

FIG. 7c illustrates an embodiment of a processing unit and final assembly table.

FIG. 10a illustrates a heat exchanger of another embodiment in a collapsed configuration.

FIG. 10b illustrates the heat exchanger of FIG. 10a in an expanded configuration where manifolds expand in response to fluid being introduced into the cavity of the heat exchanger with the fluid entering the cavity at a first port and flowing through a plurality of expandable channels.

Figure 1:
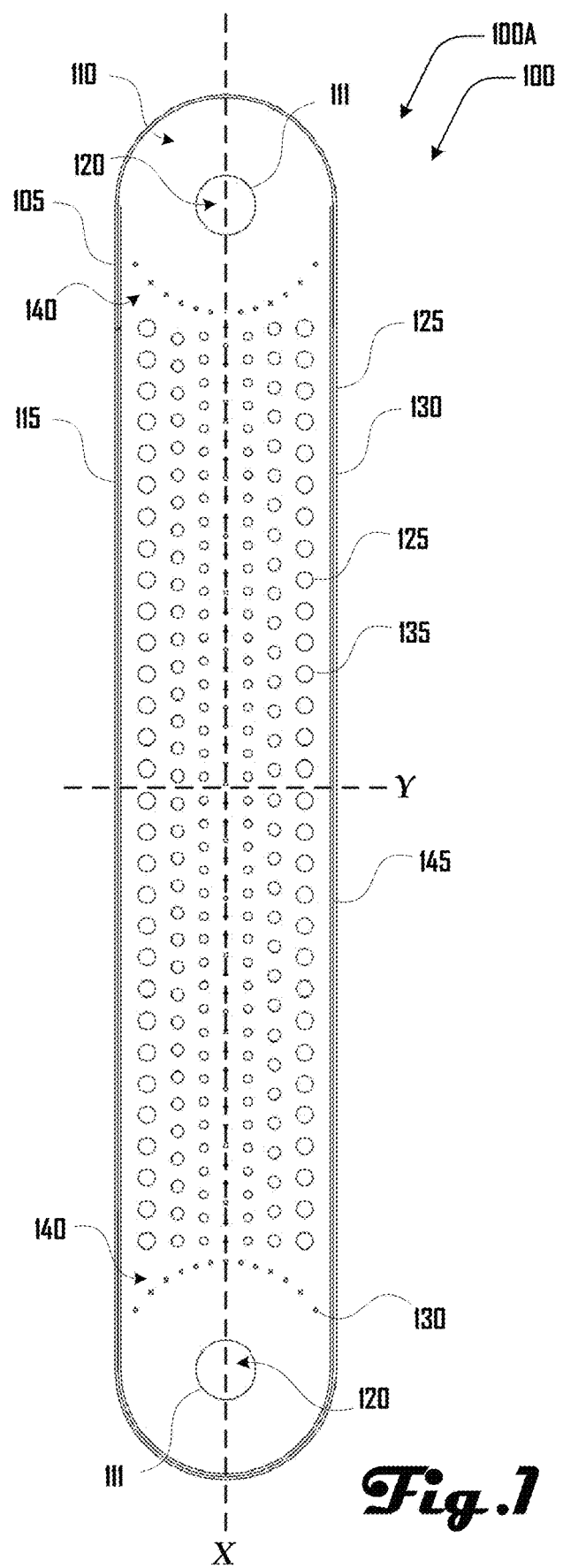
FIG. 1 is a top view of a heat exchanger in a flat configuration in accordance with one embodiment.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Conventional fin-and-tube heat exchangers such as car radiators are highly constrained in geometric layout and do not fit well into confined volumes of arbitrary shape. In comparison, example novel polymeric heat exchangers as discussed below, which use high surface area fluid filled volumes without fins, can be arrayed in complex geometries and used to fill near arbitrary shapes. For example, complex duct work can be expanded to fill available space and have integrated heat exchangers that take advantage of this flow volume. Such a system can be desirable for performing various functions within one integrated module of somewhat arbitrary shape between inlets and outlets, including the functions of ducting air and transferring heat.

In various embodiments, a heat exchanger can comprise two thin flexible polymer films and the physical size and shape of the heat exchanger can be at least partially determined by inflation of the heat exchanger. For example, an interior tube or channel or passage of a heat exchanger can be pressurized in comparison to an exterior of the heat exchanger. Additionally, in various embodiments, the size and/or shape of a heat exchanger can be at least partially constrained by the physical space in which the heat exchanger is located. By constructing the heat exchanger in a way where the inflated heat exchanger arrives at a new physical geometry, heat exchangers can be made that have different operating sizes and shapes than their manufactured sizes and shapes and/or their installed sizes and shapes, and can be made to conform to their surroundings.

Various embodiments can enable the more effective use of available space in systems that are space or volume constrained. For example, with rigid heat exchanger technology, it can be difficult to assemble or install a heat exchanger that fits into non-rectilinear spaces. With conformal heat exchangers, a design can be made that is first inserted into a long or winding duct, and is then inflated with fluid to fill the duct space in a way that is quicker or easier than making a custom arbitrary shape for a rigid heat exchanger and then constructing a duct around it. This ability is not limited to ducts, and conformal heat exchangers can be configured to assume any suitable arbitrary, non-duct shapes.

Figure 2:
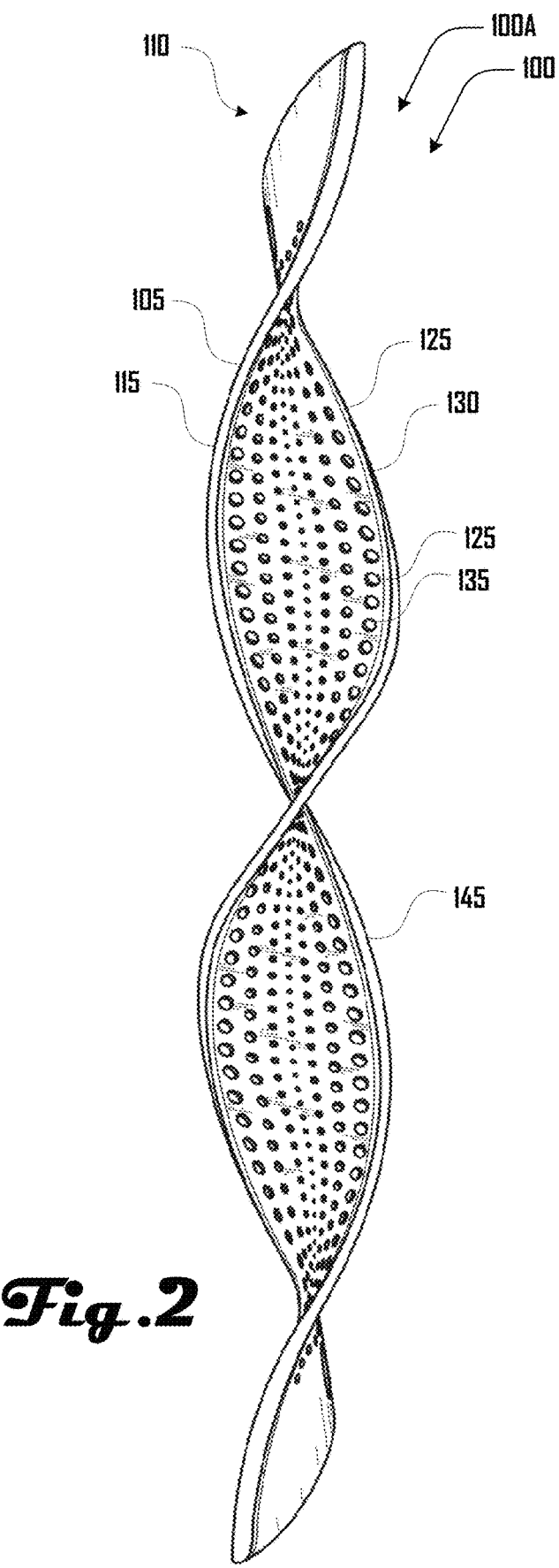
FIG. 2 is a perspective view of the heat exchanger of FIG. 1 inflated with fluid, which causes the heat exchanger to assume a helical configuration.

Turning to FIGS. 1 and 2, a first embodiment 100A of a membrane heat exchanger 100 is shown as comprising an elongated planar body 105 that includes a chamber 110 defined by a pair of coupled sheets 115, with the chamber 110 extending along the length of the body 105. The body 105 extends along an axis X, with the heat exchanger 100 of this example 100A having symmetry about axis X and about perpendicular axis Y.

The chamber 110 is further defined by a pair of ends 111 that define ports 120 that are respective openings to the chamber 110. As discussed herein, the ports 120 can be used to allow fluid to enter and/or exit the chamber. The pair of sheets 115 that define the chamber 110 are coupled peripherally via seams 125 that define a peripheral edge 130 that forms the enclosed chamber 110. Additionally, the opposing sheets 115 can be further coupled via one or more seams 120 that define one or more internal coupling 135.

For example, as shown in FIGS. 1 and 2, the internal couplings 135 can comprise circular seams 120 of various sizes that couple the sheets 115. The internal couplings 135 can be disposed in columns that extend parallel to axis X, with columns of internal couplings 135 becoming increasingly smaller from the peripheral edge 130 toward central axis X. A portion of the internal couplings 135 can be disposed in a coupling arc 140 about the respective ends 111 that define the ports 120. For example, the internal couplings 135 of a coupling arc 140 can be disposed in an arc about the ports 120 at a common radial distance from the ports 120, which can correspond to a radial distance from a portion of the peripheral edge 130 and the ports 120.

Additionally, a spine 145 can be disposed along the sides of the heat exchanger 100, which in some examples can be a portion of the cavity 110 defined by elongated tubes or ducts, and such spines 145 can create linear regions of limited contraction in at least one direction, which can be desirable for supporting the heat exchanger 100 and/or controlling the shape of the heat exchanger when inflated and/or deflated.

In various embodiments, a heat exchanger 100 can be configured to change size and/or shape in response to fluid being present within the cavity 110 of the heat exchanger 100. For example, FIG. 2 illustrates the example heat exchanger 100A of FIG. 1 in a helical configuration as a result of fluid being disposed within the cavity. In various embodiments, the heat exchanger 100 assuming the helical configuration can be as a result of a difference in contraction between the peripheral edges 130 compared to central portions of the heat exchanger 100 that can result when fluid is present within the cavity 110.

In addition to the example embodiment 100A of FIGS. 1 and 2, further embodiments of a membrane heat exchanger 100 can be defined by first and second thin-film polymer membrane sheets 115 that are stacked and coupled together to define a chamber 110 having at least a first and second end 111. For example, FIGS. 3*a*-*c* and 4*a*-*c* illustrate two further example embodiments 100B, 100C of such a membrane heat exchanger 100.

Figure 3A:
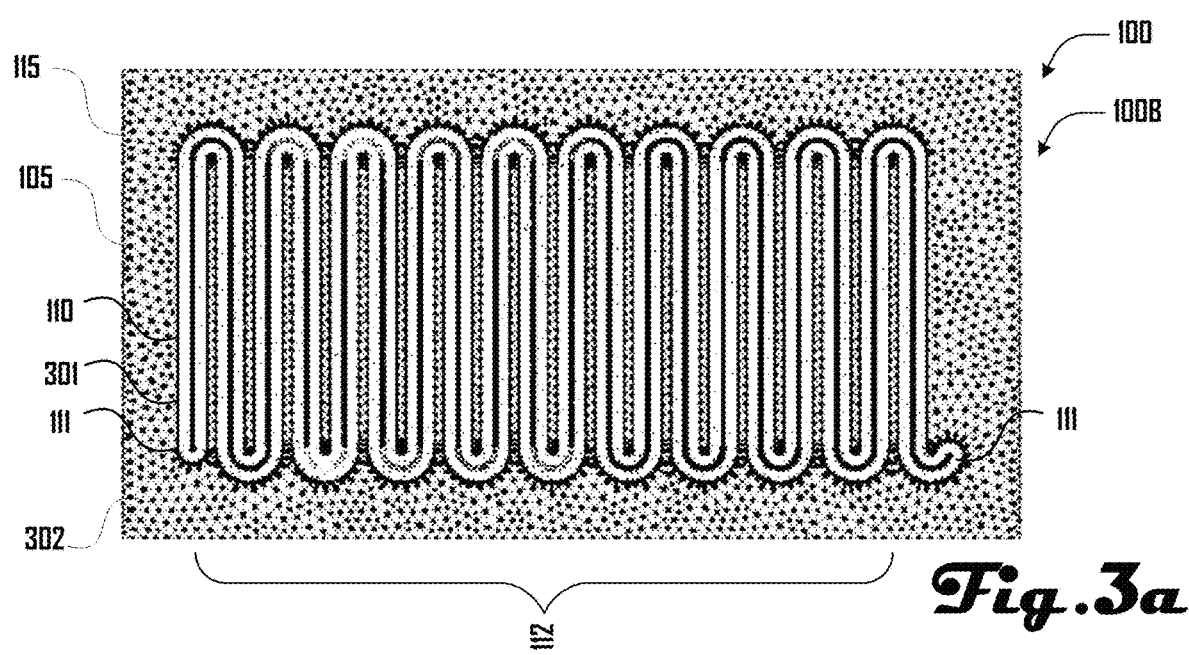
FIGS. 3a and 3b illustrate a further embodiment of a membrane heat exchanger in a flat configuration and FIG. 3c illustrates the membrane heat exchanger of FIGS. 3a and 3b in an expanded configuration.
Figure 3B:
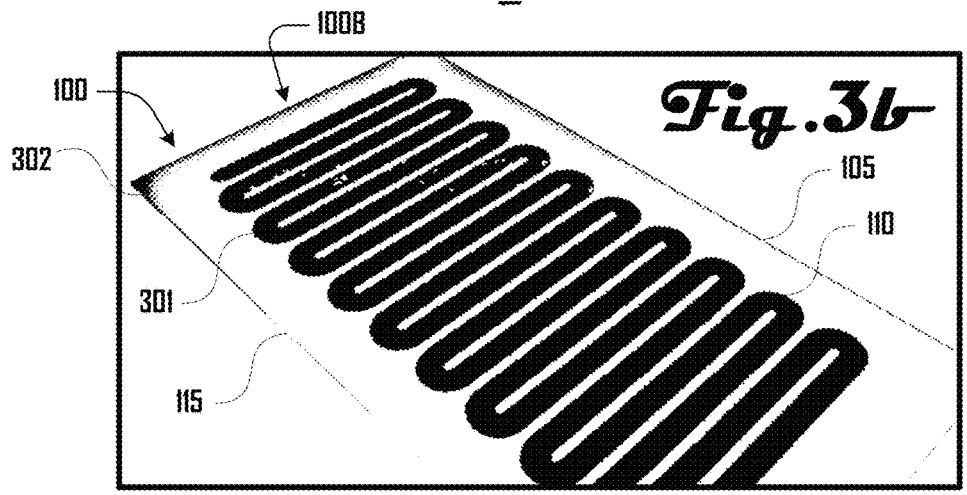
Figure 3C:
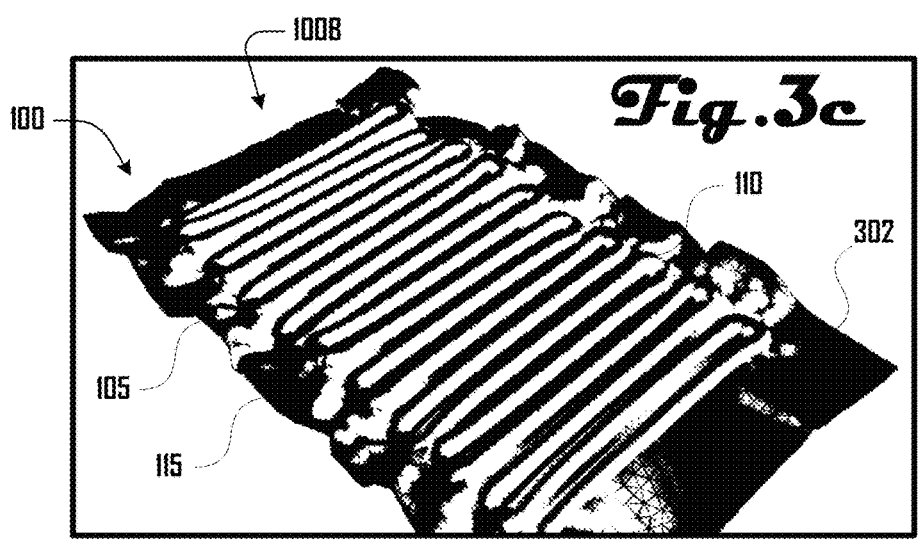

Turning to FIGS. 3*a* and 3*b*, top and perspective views of the membrane heat exchanger 100B are illustrated in a flat configuration, with the chamber 110 being defined at least by a seam 125, which joins a pair of sheets 115. The planar portions of the membrane heat exchanger 100 between the chamber 110 can be defined by a planar coupling 302 between a pair of sheets 115. FIG. 3*c* illustrates an example of the membrane heat exchanger 100B in an expanded configuration, wherein the chamber 110 is expanded by fluid filling the chamber 110. In this example, the sheet(s) 115 are shown deforming due to the chamber 110 being filled with fluid.

Figure 4A:
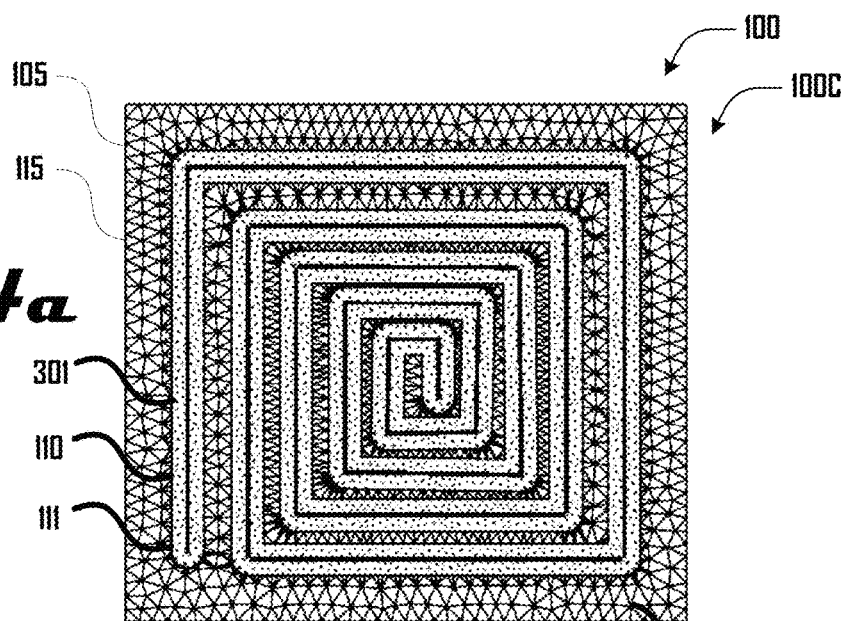
FIGS. 4a and 4b illustrate a further embodiment of a membrane heat exchanger in a flat configuration and FIG. 4c illustrates the membrane heat exchanger of FIGS. 4a and 4b in an expanded configuration.
Figure 4B:
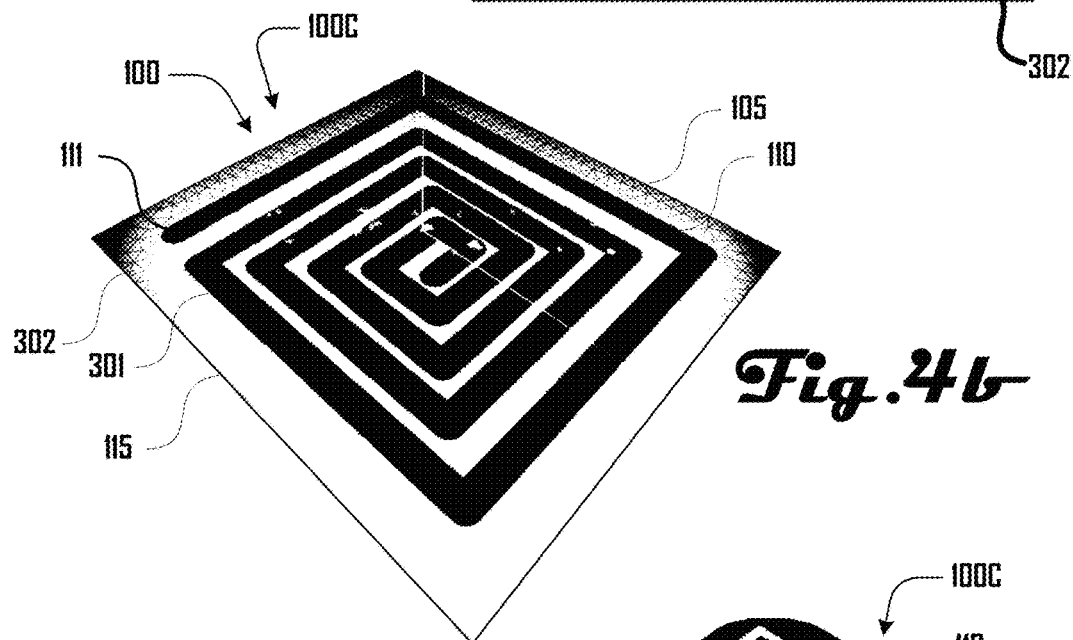
Figure 4C:
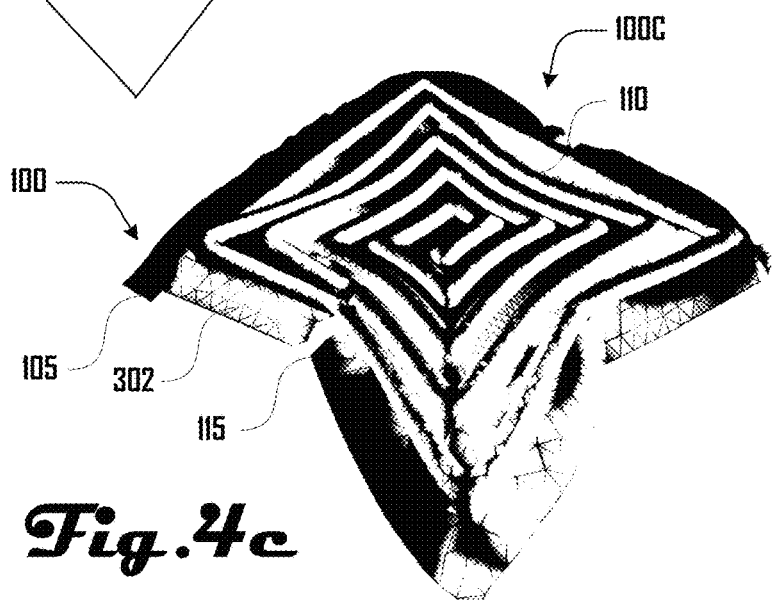

FIGS. 4*a*-*c* illustrate a further example embodiment 100C of a membrane heat exchanger 100 that can be defined by a pair of sheets 115, coupled together by a planar coupling 302 and/or seam 125. In this example, the chamber 110 rectangularly coils from a peripheral portion of the membrane heat exchanger 100B to a central portion of the membrane heat exchanger 100 with the ends 111 of the chamber 110 being respectively disposed at the peripheral and central portions.

Figure 5A:
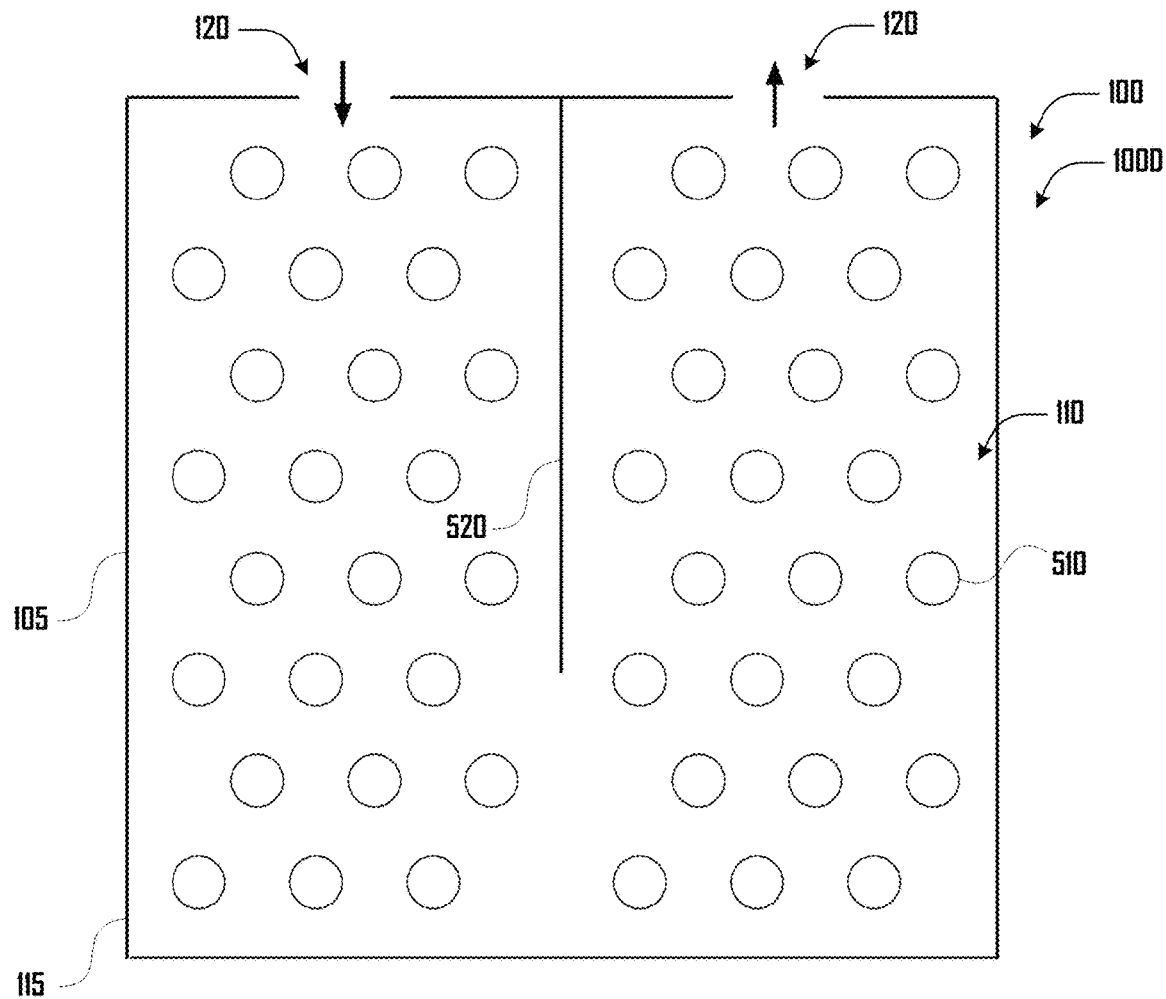
FIGS. 5a and 5b illustrate yet another embodiment of a membrane heat exchanger.
Figure 5B:
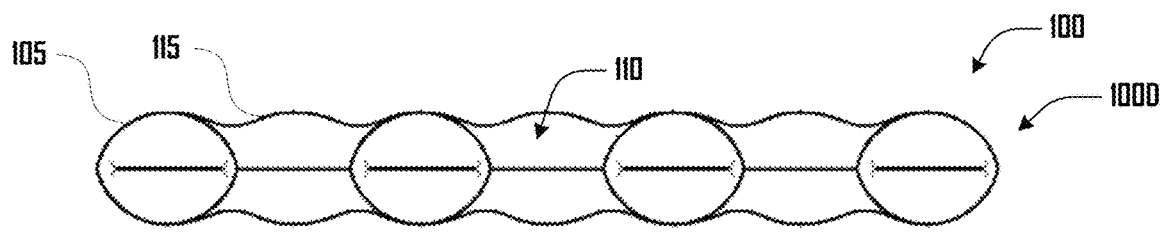

Although specific embodiments of membrane heat exchangers 100 and chambers 110 are discussed above, further embodiments can have chambers 110 of any suitable size, shape and configuration and the present examples should not be construed to be limiting on the wide variety of configurations of membrane heat exchangers 100 that are within the scope and spirit of the present disclosure. For example, FIGS. 5*a* and 5*b* illustrate an example of a pillow-plate heat exchanger 100D in accordance with an embodiment, which includes a planar body 105 that comprises a chamber 110 defined at least in part by a plurality of dimples 510 and a bifurcating seam 520 that couples opposing sheets 115.

Figure 6A:
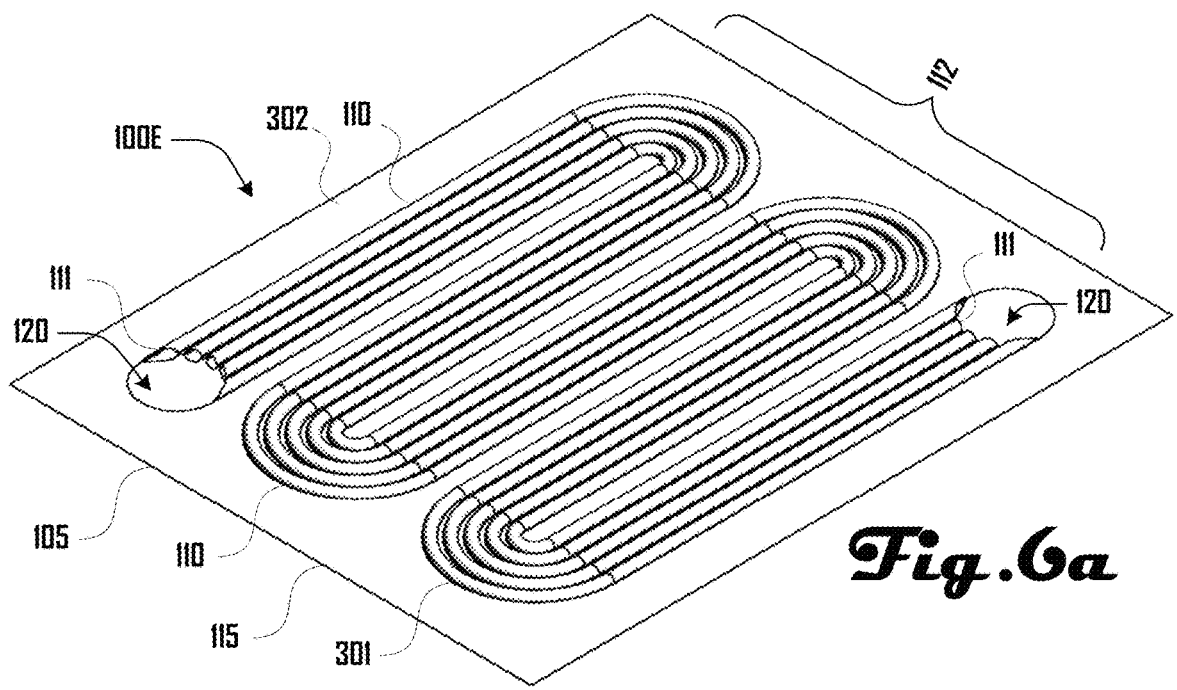
FIGS. 6a and 6b illustrate still further embodiments of a membrane heat exchanger.
Figure 6B:
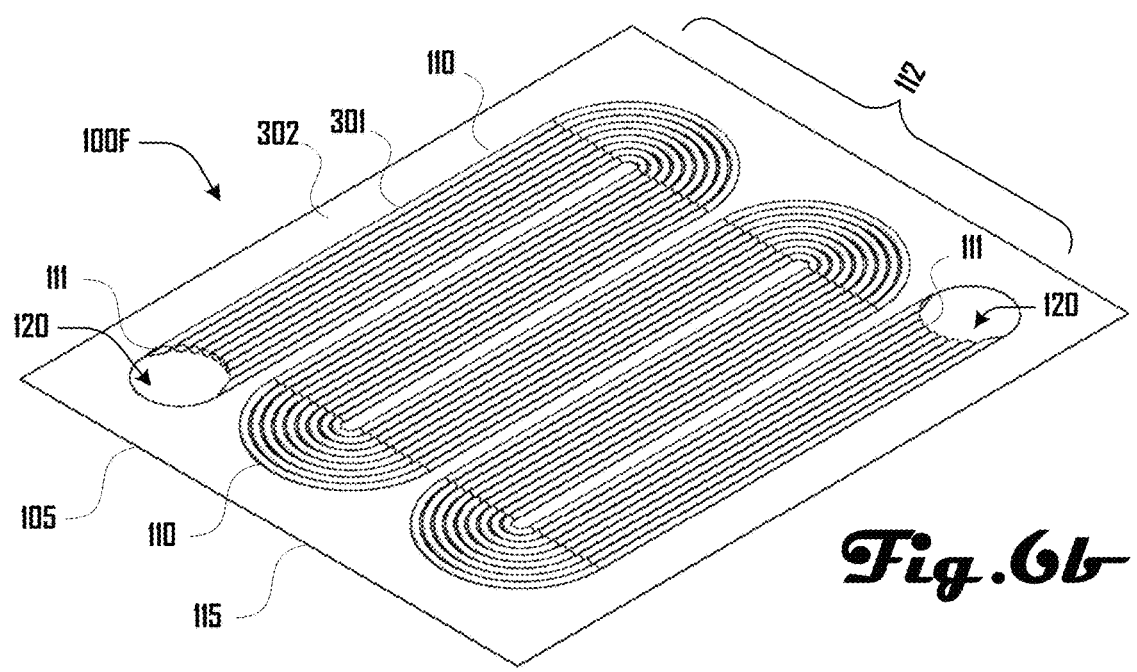

Additionally, while various embodiments described herein illustrate a membrane heat exchanger 100 having a heat exchanger body 105 that defines a single chamber 110 with a pair of ends 111, in further embodiments, a heat exchanger body 105 can define a plurality of chambers 110. For example, FIGS. 6*a* and 6*b* illustrate example embodiments 100E, 100F of a membrane heat exchanger 100 that comprises five and nine chambers 110 respectively. In these example embodiments 100E, 100F a plurality of nested chambers 110 are illustrated in a switchback configuration 112 with respective ends 111 of the chambers 110 terminating at respective ports 120 disposed on opposing corners of the heat exchanger body 105. As discussed herein, the chambers 110 can be defined by seams 125 and/or planar coupling portions 302 that couple a pair of opposing sheets 115.

Accordingly, various embodiments of a membrane heat exchanger 100 can comprise of a plurality of small and thin-walled chambers 110 instead of heavy, metal tubes with soldered-on fins as in conventional heat exchanger systems. Thus, various embodiments of a membrane heat exchanger can be configured to decrease ΔT while keeping Q constant by increasing the surface area A, which can be achieved (without increases to mass and cost) by a small thickness t.

By Equation 2, low thermal conductivity materials can be used in some embodiments of heat exchangers 100 by using a small thickness t. Based on hoop stress, the wall thickness required to hold a given pressure can be:

$$t = (\text{Pressure} \cdot \text{Tube radius})/\text{Material stress} \qquad (5)$$

In various embodiments, chambers 110 of a small radius can generate lighter and cheaper membrane heat exchanger 100 with better thermal conduction compared to conventional heat exchangers. For example, in various embodiments, four times as many chambers 110 of half the diameter doubles heat transfer for the same system mass/cost. Diameters of chambers 110 in the 1-10 mm range can be provided in accordance with some embodiments, with surface heat transfer coefficients h of around 50-100 W/(m²K) for air, and 5,000-10,000 W/(m²K) for flowing water and the condensing and evaporating of water.

Membrane heat exchangers 100 can comprise various suitable materials, including polymers, and the like. For example, some embodiments can comprise polyethylene terephthalate (PET), polyethylene, polypropylene, fluoropolymers, polyimides, polyamides, and the like. In one preferred embodiment, Polyethylene terephthalate (PET) films can be used, which in some implementations can have strengths as high as 200 MPa or more and thermal conductivities k in the 0.15-0.4 W/(mK) range, depending on additives. From Equation 5, in some embodiments, a desired wall thickness is t=0.005 mm for a safe working stress of 30 MPa, tube diameter of 3 mm, and an operating pressure of 0.1 MPa (one atmosphere)(other suitable thicknesses can be employed in further embodiments). Thus k/t≈30,000-80,000 W/(m²K), is higher than the above surface heat transfer coefficients h, so by Equation 2 the relatively low thermal conductivity of a thin PET film is not a limiting factor for performance in various embodiments.

Accordingly, embodiments that employ thin film polymer membranes can enable a substantial increase in surface area and heat exchanger performance. In other words, while polymers can have lower thermal conductivities k than metal, their thickness can be made small enough that t/k is small relative to $1/h_1$ and $1/h_2$.

As discussed herein, the heat transfer rate in a membrane heat exchanger 100 can be directly proportional to the surface area of the membrane heat exchanger 100. Accordingly, increasing the surface area can increase the overall heat transfer, thereby increasing performance. In various embodiments, computer-controlled manufacturing and polymer processing can enable the fabrication of membrane heat exchanger 100 with thin walls and small masses, enabling increased surface areas while maintaining effectiveness of the membrane heat exchanger 100.

Accordingly, various embodiments discussed herein can use thin polymeric membranes for high surface-area membrane heat exchangers 100, loaded within appropriate safety factors of the hoop-stress limit. In some embodiments, such a configuration can be enabled via patterned chambers 110 which can be generated via laser processing of pairs of sheets as discussed herein.

Using computer-controlled manufacturing tools, a number of fabrication options are available with thin polymeric membranes, which can be amenable to rapid-prototyping as well as production. Additionally, the resilience of polymeric materials enables their use in various embodiments even when processed into very thin films—i.e., films thin enough to have negligible impact on the heat transfer rate across them.

For example, the heat transfer rate, Q, across a heat exchanger can be shown to be:

$$Q = h_0 A \Delta T_{LM} = \frac{A \Delta T_{LM}}{\frac{1}{h_w} + \frac{1}{h_a} + \frac{t}{k_m}} \quad (1)$$

where $h_0$ is the overall heat transfer coefficient, A is the surface area of the heat exchanger, $\Delta T_{LM}$ is the logarithmic mean temperature difference across the heat exchanger, $h_w$ is the heat transfer coefficient of the hot-fluid that is being cooled, $h_a$ is the heat transfer coefficient of the cooling air, $k_m$ is the thermal conductivity of the membrane barrier wall between the two fluids, and t is the thickness of that barrier.

In some embodiments, increasing the overall heat transfer in a membrane heat exchanger 100 can be brought about by increasing the surface area of the membrane heat exchanger 100 and/or increasing the overall heat transfer coefficient. In an air-cooled heat membrane heat exchanger 100 the overall heat transfer coefficient can be dominated by the heat transfer coefficient of the air and there is little opportunity to increase the value of $h_0$. However, the low density and thin walls of a membrane heat exchanger 100 can allow the surface area to be greatly increased which can improve performance.

Numerically, $h_w \gg h_a$, so for a membrane heat exchanger 100 with liquid on one side and air on the other, the $1/h_w$ term is very small compared to $1/h_a$. Metals typically have good thermal conductivity (around 10-400 W/mK), so in conventional heat exchangers the $t/k_m$ term can also be ignored compared to $1/h_a$. For many polymers, thermal conductivity may be smaller, (e.g., 0.1-0.4 W/mK) but by providing a barrier less than 1 mm thick, the $t/k_m$ term is still small compared to $1/h_a$, meaning that the polymer wall will not significantly impede heat transfer through the heat exchanger compared to a metal wall. Therefore, for a given desired rate of heat transfer, $\Delta T$ can be decreased in some embodiments, provided that the surface area can be proportionally increased.

While low thermal conductivity materials can be used in heat membrane heat exchangers 100 if their thickness is very low, the wall thickness can specified by the requirement to withstand the pressure forcing fluid through the chamber(s) 110 of the membrane heat exchanger 100. Based on hoop stress, the wall thickness required to hold a given pressure is:

$$t = \frac{pr}{\sigma} \quad (2)$$

where p is the pressure in the tube, r is the radius of the tube, and $\sigma$ is the operating stress.

If we assume an example polymer film thickness of 0.1 mm (4 mil), high-density polyethylene (HDPE) with a maximum stress of 25 MPa and a working stress of 5 MPa, a 4 mm diameter tube can have a burst pressure of 1.25 MPa (180 psi), and a working pressure of 0.25 MPa (36 psi). Given a high-density polyethylene HDPE density of 970 kg/m$^3$ this polymer film would have a mass of 0.097 kg/m$^2$. In further embodiments, higher strength polymers can be used and/or tube diameters can be reduced. This indicates that such embodiments of membrane heat exchangers 100 can be mechanically resilient in addition to thermally responsive.

For the air side of the heat exchanger, the heat transfer rate, Q, can constrain the air mass flow rate, m, $$Q = mc_p \Delta T_a \quad (3)$$

where $c_p$ is the specific heat capacity of air, and $\Delta T_a$ is the difference in temperature between the air entering and exiting the heat exchanger. Increasing mass flow across the heat exchanger surface can be accomplished through increased air velocity, but that brings with it increased power consumption, which may not be desirable. Assuming laminar flow, the fans power consumption depends on the square of the linear velocity of the air, $$P = (8A\mu v^2)/d \quad (4)$$

where v is the air velocity through the heat exchanger, d is the effective diameter of the air flow passage, $\mu$ is the viscosity of the fluid, and A is the surface area of the heat exchanger. Increasing the heat exchanger area can increase the flow resistance and thus the fan power for a given velocity; however, the air velocity can be reduced by increasing the cross-sectional area accepting the airflow. Since fan power can be proportional to the cross sectional area but also to the square of velocity, the trade-off of increased area for decreased velocity can result in a net reduction in fan power.

At small or large scale, embodiments of membrane heat exchangers 100 can be made using manufacturing techniques and by optimization of the geometric design, fluid connections, and pumping controls. By moving to small diameter chambers 110 and thin materials, a large number of parallel linear flow paths can be enabled in various embodiments (e.g., as illustrated in FIGS. 6a and 6b). In one example manufacturing process, a computer-controlled laser welding process can be used to generate arrays of chambers 110 from the controlled welding of two plastic sheets.

Accordingly, various embodiments comprise the use of thin polymers for membrane heat exchanger construction and the manufacture of such membrane heat exchangers 100 using computer-controlled plastic welding system. The use of a plurality of narrow chambers 110 made from thin polymer films in some embodiments can create a barrier between heated water and cooling air that is thin enough such that the thermally non-conductive polymer only minimally impacts the overall heat transfer coefficient. Combined with research in computer-controlled laser welding, these membrane heat exchangers 100 can be rapidly prototyped and provide for volume production, as well. The use of low cost, low weight polymers and high-throughput manufacturing enables embodiments of the membrane heat exchangers 100 to have larger heat exchange areas for less cost, leading to favorable coefficients of performance.

Various embodiments can comprise computational, physics-based optimization tools for polymeric heat exchanger design. For example, some embodiments include software tools for membrane heat exchanger design optimization.

Further embodiments include a laser processing manufacturing method that enables high geometric and three-dimensional complexity from two-dimensional patterns produced rapidly and cost effectively. Some embodiments can provide for large area and continuous fabrication. Still further embodiments can include 20-year heat exchanger lifetimes for the selected materials.

Some embodiments comprise computer-controlled fabrication methods for welding and cutting polymer films into intricate fluidic networks and structures, for rapid prototyping and commercial production. Further embodiments comprise computational modeling and optimization of fluidic networks and membrane patterns to minimize flow restrictions and maximize thermal transfer.

TABLE 1

Specification of an example 20 kW system.

| Parameter | Calculated | Required |
|---|---|---|
| Heat transfer rate Q | 23.6 kW | 20 kW |
| Pump power | 18.1 W | |
| Fan power | 39.0 W | |
| Total pump and fan power | 57.1 W | |
| fan and pump power/heat transfer rate | 350.6 | >200 |
| Effectiveness ε | .65 | >.6 |
| Overall heat transfer CoE | 66. W/m$^2$K | |
| Surface area | 33. m$^2$ | |

Still further embodiments leverage materials science and chemistry of polymer thin films, working with resin and additive manufacturers, to develop materials with optimized thermal properties, long functional lifetimes, controlled surface chemistry, and robust processability. Accordingly, various embodiments can comprise computationally enabled heat exchanger design and optimization, selection of robust materials amenable to inexpensive and ultimately high-throughput fabrication, and careful performance and lifetime testing and characterization. For example, computational modeling and optimization can be used to design cooling fluidic networks that optimize air and coolant flow geometries for maximal thermal transfer and increased system efficiency.

Creation of three-dimensional networks of chambers 110 from sheets of two-dimensional film can be modeled and simulated, including simulating the filling or inflation of these networks to get net three-dimensional geometry. Such two-dimensional models can be physically produced via laser film processing utilizing a roll feed CNC laser cutter and welder as discussed in further detail herein (see e.g., FIGS. 20a-c and FIGS. 21a-b). Some embodiments can comprise surface chemistry modifications to improve weld, lamination, or the like. Additives can be selected for improved material processing, heat exchanger performance, and the like.

In some embodiments, membrane heat exchangers 100 can comprise a thin metallic foil. Such metal membrane heat exchangers 100 can be constructed/welded in a similar manner to the polymer heat exchangers discussed herein. Metal heat exchangers can be advantageous for automatable construction and higher temperature operation.

For determining the design of membrane cooling networks or chambers 110, in some embodiments, a parametric geometry authoring environment can be used, incorporating simulation of the fundamental requirements of the system—necessary pumping and fan power, heat transfer performance, material cost, and the like. While these (and other relevant parameters such as total internal volume, total bounding volume, etc.) can be dynamic "in the loop" calculations from a given geometry which the author can use as a metric for analysis, they can also be specified as design inputs, and an integrated constrained optimization can suggest geometries and properties which optimally satisfy the application-specific efficiency and cost targets.

The underlying coolant flow model for this simulation and optimization layer can incorporate laminar and/or turbulent incompressible flow. On the liquid side, the pumping power and the convective heat transfer coefficient can be determined by employing equations of internal, incompressible flow, for both the laminar and turbulent cases, where, in the turbulent case, empirical relations can be used for friction factor in determining head loss. Computational fluid dynamics (CFD) topology optimization methods and genetic algorithms can be built on top of this model to produce optimal tube geometries.

One model of the forced-air side of the boundary can be used for informing high-level geometry and flow configuration decisions with reasonably low latency. In some embodiments, in can be beneficial to have a more sophisticated high-resolution model for specific concerns, such as fine-tuning optimal spacing between the coolant tubes and layouts for efficient airflow. Such a model may more accurately quantify local liminal heat transfer coefficients, particularly when the airflow is perpendicular or at various angles to the coolant tubes, as well as account for the possibility of non-negligible hydrodynamic and thermal entry lengths. Such a model can be run offline, and may not be used at the integrated optimization stage in some embodiments, and as such could be chosen from a range of professional-grade commercially available computational fluid dynamics software.

As illustrated in FIGS. 2, 3c and 4c, filling a membrane heat exchanger 100 can change the shape of the body 105 by including the introduction of local buckling and bending. In various embodiments, such geometric contortions can be accounted for and compensated for or planned for in the design of the membrane heat exchanger 100. Such software can model net shape membrane structures under filling and environmental loading, and can further include more sophisticated analysis tools, visualization, and coupling of simulation to real-world performance.

Example software for solving the net shape geometry problem of constructing and engineering a machine from flexible sheets can include simulation of an unloaded membrane heat exchanger 100 and a simulated net shape of the membrane heat exchanger 100. The shrinking along the long axis caused by filling the tubes with a virtual fluid is apparent as is the buckling of the sheets along the edges as shown in FIGS. 3c and 4c. This modeling can help in the optimization of the design and generate a heat exchanger 100 with desirable shape-changing properties.

Additionally, some embodiments of shape modeling can comprise an "inverse" inflation simulation. For example, such modeling can take as input a target 3D shape, given either by the designer or by an optimization pass, and produce a rest shape to be manufactured, which for given materials and subject to specified forces can as closely as possible approximate the target shape under load.

Membrane or sheet joining methods can comprise mechanical methods, adhesive methods, welding methods, and the like. Mechanical methods such as sewing or clamping/interlocking with rigid parts can be desirable in some embodiments because they can be tolerant processes that are stable across a variety of process parameters. Adhesive bonding can accommodate a wide variety of material combinations and can be carried out at low temperatures in some embodiments.

Various example embodiments can use weld spots to constrain inflation of the heat exchanger 100 and can use various sizes of weld spots to cause the inflated sheet to take a specific shape. For example, as shown in FIGS. 1 and 2, internal weld spots or couplings 135 can be equally spaced but can be smaller along the center of the sheet 115. In various examples, such a configuration can cause the sheet 115, which can cause the edges to contract less when the heat exchanger 100 is inflated. Such a configuration can also cause the center (e.g., proximate to axis X) of the heat exchanger 100 to contract more when the heat exchanger 100 is inflated. Weld spots or couplings 135 can be larger along both edges of the heat exchanger 100.

While the size and spacing of spot welds or other couplings between two sheets 115 can control the contraction of the sheets 115 when inflated, long tubes defined by chamber 110 can create linear regions of limited contraction in at least one direction. This can create spines 145 of the inflated geometry (e.g., as shown in FIGS. 1 and 2). Similar architectural features can also be generated with two-dimensional inflated regions or two-dimensional welded regions, or with other arbitrary regions of welds or unwelded areas.

Various embodiments can be configured for ease of manufacturing, whereby the same manufacturing line or same set of tooling can be used to make variations of final shapes, sizes, and form factors of heat exchangers 100 only by modifying the arrangement and size of weld locations in the heat exchanger constituent films or sheets 115. An example of this is a dot weld pattern that can be used to weld two pairs of polymer films together, where the dot welds constrain the inflation of the two polymer films 115 when the space between those two polymer films 115 can be filled with a higher pressure fluid than the exterior of the heat exchanger 100. The dots can be modified to be of different sizes, shapes, and locations so that physical inflation creates a variety of different inflated geometries. The use of dots in various examples (e.g., FIGS. 1 and 2) is only illustrative, and various other types of weld shapes and patterns can be used to generate different inflation geometries.

FIGS. 1, 2, 3a-c, 4a-c, 5a and 5b illustrate various embodiments of membrane heat exchangers 100 but should not be construed to limit the wide variety of alternative and/or additional shapes, sizes, and structures that are within the scope and spirit of the present disclosure. For example, complicated inflatable geometries can be added to the membrane heat exchanger elements so as to provide structural spacing between adjacent elements. In some embodiments, bubbles can be created within the membrane elements that periodically connect with adjacent heat exchanger elements so as to maintain a given air gap between heat exchanger elements. In some embodiments, an inflated structure of the heat exchanger elements can be used to add stiffness to the heat exchanger elements and thereby reduce the need for external structural support.

Additionally, the example embodiments of membrane heat exchangers 100 can be combined in various suitable ways. For example, any given embodiment can suitably incorporate elements of one or more other embodiments and/or elements of a given embodiment can be absent. Accordingly, the present examples should be construed as illustrating various elements of heat exchangers 100 that can be suitably combined to generate further embodiments of heat exchangers 100 having suitable properties, shape changing characteristics, shapes, sizes, configurations and the like.

Membrane heat exchangers 100 can be fabricated in various suitable ways. For example, FIG. 7a illustrates an example embodiment of a printer 700 configured for roll-to-roll "printing" of fluidic chambers 110 and surface features on an adjoining pair of sheets 710, with the fluidic chambers 110 being at least defined by printed seams 125 as discussed herein. FIG. 7b illustrates an embodiment of a full roll laser welder 701 and FIG. 7c illustrates an embodiment of a processing unit and final assembly table 702.

Figure 8A:
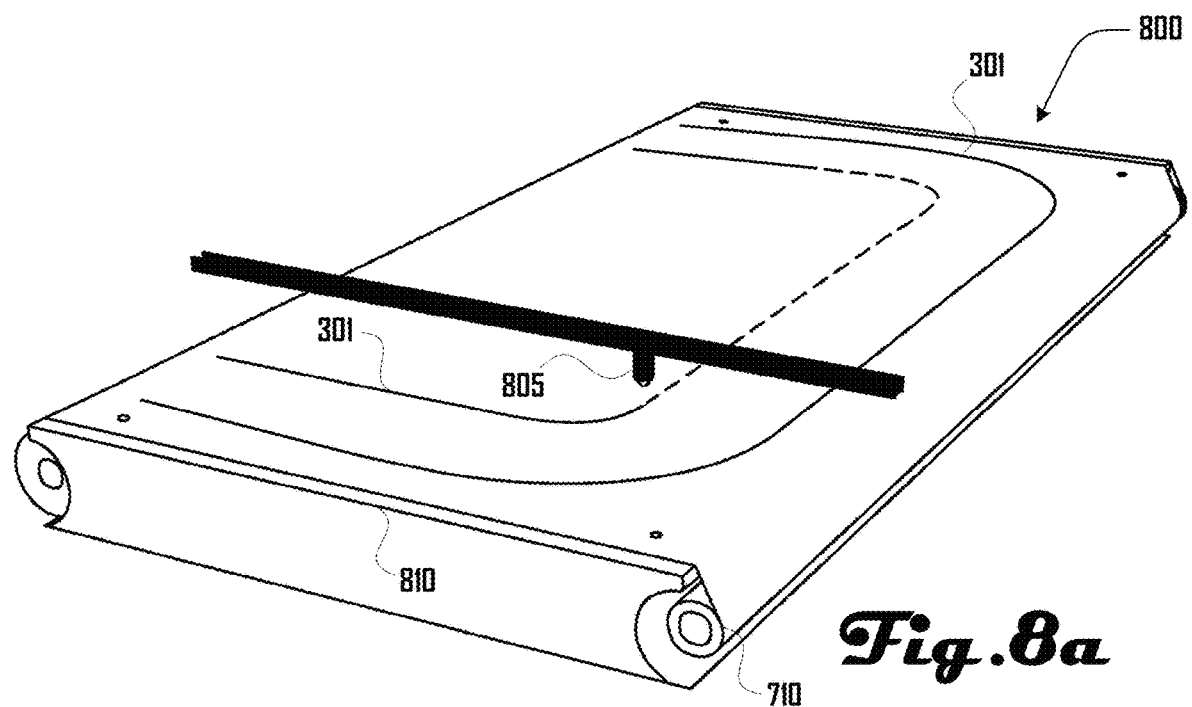
FIGS. 8a and 8b illustrate a welding apparatus in accordance with one embodiment that includes a welding head that is configured to weld seams in an adjoining pair of sheets.
Figure 8B:
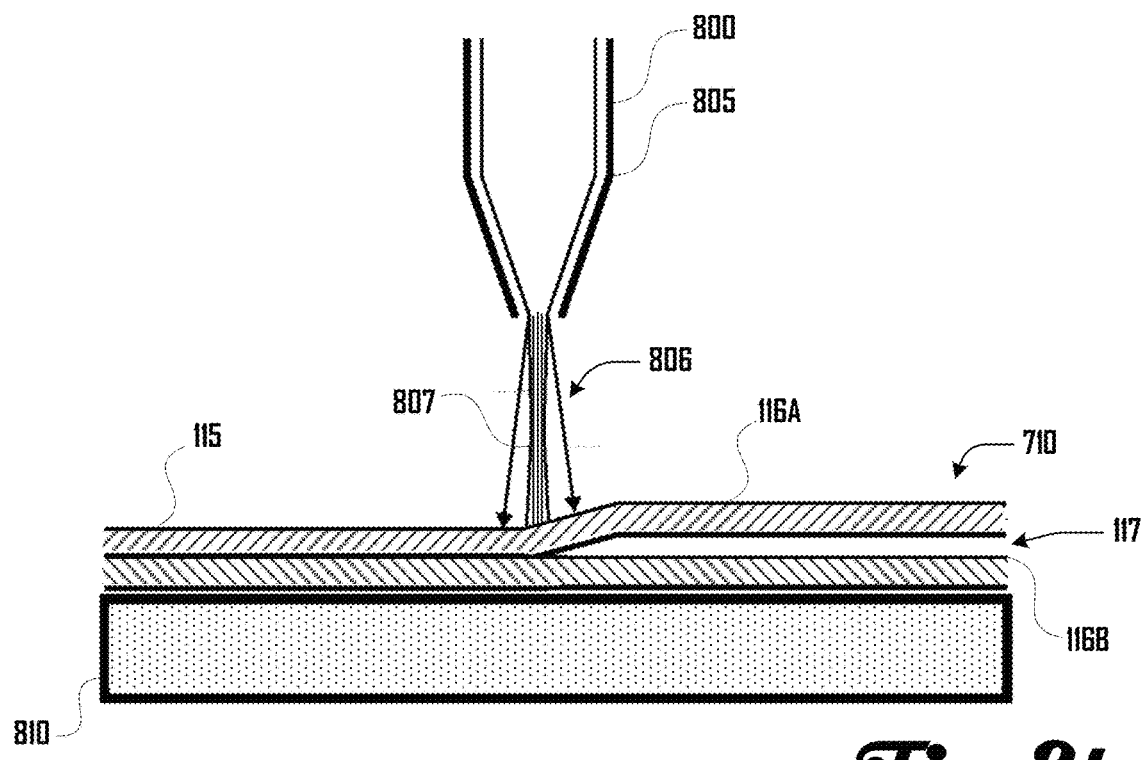

Coupling of sheets 115 to generate seams 125 and/or planar coupled portions 302 of a membrane heat exchanger 100 can be done in various suitable ways as discussed herein including welding. FIGS. 8a and 8b illustrate a welding apparatus 800 in accordance with one embodiment that includes a welding head 805 this is configured to weld seams 125 in an adjoining pair of sheets 710, which are rolled over a welding table 810. As illustrated in FIG. 8b, a first and second sheet 116A, 116B can be disposed on the welding table 810 with a gap 117 therebetween. The first and second sheet 116A, 116B can be pressed together via a pressurized stream of gas 806 from the welding head 805 and a laser 807 can weld the first and second sheet 116A, 116B at a seam 125 and/or planar 302 coupling joint. For example, in plastic welding, two thermoplastic material interfaces 116A, 116B can be brought into direct contact and heated above their melting temperature via the laser 807. Compatible materials can then interlock at a molecular level resulting in a continuous matrix of polymer chains, which generates a seam 125 and/or planar 302 coupling joint.

One challenge in some welding applications can be transferring heat to the joint interface at the weld location without degrading the integrity of the surrounding material. For thick-sectioned parts where it can be difficult to transfer heat from the outside accessible surface of the part stack, various suitable methods can be used to generate a weld. For example, one method, called hot plate welding, comprises heating the joint surfaces with the parts separated and then bringing the parts in contact while the joint surfaces remain above the material melt temperature.

Ultrasonic and radio frequency (RF) welding can be used in some embodiments and can comprise transferring vibrations to the joint interface through the accessible outside parts surfaces and directing these vibrations to targeted areas where the weld is required using what are known as energy directors.

Transmissive laser welding can also be used in some embodiments. For example, the energy in a laser beam can be turned into heat when it interacts with a material that is opaque to the wavelength being used. In order to target the heat generated to material interface, in various embodiments, one of the parts must be transparent to the laser wavelength such that the laser beam passes through it and generates heat at the joint interface when it hits the second, opaque material.

Inductive welding can also be used in some embodiments, where an interposing material that heats up in presence of an electromagnetic field is placed at the bond interface and then activated with such a field.

A hot air jet can also be used for welding sheets together in various embodiments. Such a method can serve to both heat and press the membranes together. In various embodiments, the weld-affected zone can further be managed by use of cold air jets. Alternatively and/or in addition, hot fluid jets can be used for welding. With close active surface following, it is possible to get high effective clamping pressures in a similar manner to a static air or hydraulic bearing.

In further embodiments, membrane heat exchanger elements can be thermal/ultrasonic/radio frequency welded and blanked in one process via a stamping type operation with a single tool of the desired shape. This can enable high speed and low cost manufacture of heat exchanger elements.

For welding a pair of sheets 115, the volume, gap or chamber 110 between the sheets 115 can be actively evacuated, providing a clamping force, which can be atmospheric pressure or the like. For large surface area membrane heat exchangers 100, cumulative weld length can be high in some embodiments. Accordingly, some embodiments can employ redundant welds, that is, multiple welds side-by-side, to reduce sensitivity to individual weld defects.

Various suitable welding techniques can be used, in more elaborate forms, to assemble multiple polymer film heat exchanger elements together with integral plumbing pathways. Fluid inlet and outlet fittings and hoses, and the like, can be similarly attached to the assembled heat exchanger elements via suitable welding or coupling methods.

In some embodiments, thin film plastic welding shares many of the same challenges as thick section plastic welding but can have one or more mitigating factors by nature of the thin section geometry. While it can be unfeasible to have direct heat transfer to the accessible surface of a thick section part in some embodiments, in thin film welding, the thickness of the material can be such that this is possible because the through-thickness size of the heat affected zone of the weld is similar to that of the whole material.

This fact can enable further suitable methods to be used in some embodiments, including direct thermal welding and direct laser welding. In direct thermal welding, two compatible films can be clamped between a hot tool and anvil such that heat is transferred to the joint, melting the interface and creating a bond. In direct laser welding a laser beam can strike two compatible materials and heat the whole joint thickness.

One example implementation includes a direct laser welding process. Here, two layers of LDPE film can be welded together using a $CO_2$ laser beam. This process was prototyped using a multi-purpose CNC laser cutter. The laser beam was defocused such that a weld of desired width (~1-2 mm) was created between the two film layers. A reflective aluminum layer was placed under the films to make the materials absorb a greater portion of the incident laser beam and the stream of high pressure assist gas used in many laser cutting processes was leveraged to provide a clamping force between the films while the laser energy is delivered. This particular application included parts larger than the bed of the CNC laser available so a reel-to-reel fixture was implemented that fit with the laser cutter such that continuous patterns up to 50 feet long were created.

Another embodiment can comprise a piece of manufacturing equipment for laser welding and cutting of polymer films. This example machine directly receives 8 feet long rolls of two-ply films, and uses a 70 W $CO_2$ laser carried on a 4'×8' CNC gantry to weld the layers together in an appropriate pattern.

In some embodiments, because the laser beam spot size required for welding is an order of magnitude greater than that needed for cutting, a dedicated optics system can be implemented that welds at the laser beam focus position and has low beam divergence which means that the position of the laser beam focus relative to the material position in the out of plane direction (z-axis), can be tolerant to positioning errors. This can reduce the alignment and precision requirements of the CNC structure which has a percolating effect on the cost and complexity of the machine.

Also, because of the lower power needed for welding as opposed to cutting in some embodiments, such embodiments can utilize a lower-cost air cooled laser that can be directly mounted to the CNC gantry as opposed to flying optic systems with a stationary laser source usually used in conventional laser cutters. Additionally, the reel-to-reel material handling functionality required to process films sourced on large rolls can be built into the machine which enables an automated system that can run precisely with minimum user interaction.

Such a system can also be configured to accept various pieces of inspection equipment that can be beneficial for performance applications. A machine vision system and/or laser displacement sensor can be used to verify the position and/or characteristics of the resulting weld.

Any suitable material can be welded using direct-laser welding. For heat exchanger applications, it can be desirable to select a material that can withstand relatively high operating temperatures and environmental exposure while retaining its resistance to puncture and bulk failure modes such as creep under hoop stress. The development of suitable material/process combinations in conjunction with a design that limits the stress induced within the resulting heat exchanger can give a solution that is low cost and high performance.

A wide variety of additives can be used to tune a material's specific performance, in addition to various lamination, weaving, and multi-material composite approaches that can be utilized to improve the bulk performance of a given film. Accordingly, although direct laser welding using a $CO_2$ laser source can be desirable in some embodiments, alternate welding methods can be desirable in other embodiments.

As discussed above, transmissive laser welding, ultrasonic/RF welding, and the like can provide advantages by virtue of the ability to generate heat at the weld interface. This can allow for film composites with woven or thermoset functional layers and thin thermoplastic bonding layers needed for welding. In various embodiments, transmissive laser welding can use a fiber laser source with a wavelength of 1 um as opposed to the 10.6 um wavelength of a $CO_2$ laser source. Accordingly, further embodiments can include an ultrasonic/RF welder capable of processing continuous materials in a reel-to-reel format.

The use of two polymer films or sheets 115 to make a heat exchanger 100 that is inflatable to arbitrary shapes or that can change shape, as described above, is only an example, and the same functionality in heat exchangers 100 can be achieved with other manufacturing methods in further examples, including but not limited to extrusion, blow molding, vacuum molding, 3D printing, and the like.

In some embodiments, less compliant heat exchangers made of thin polymer films can have one or more of the advantages discussed above. Some manufacturing methods, including blow molding and vacuum blow molding, can have heat exchanger end products that do not appear to be conformal but are more or less rigid; however, these manufacturing methods can create arbitrary, non-box shapes that can fit into more complex spaces. Also, the flexibility of plastics can allow them to bend or collapse more easily than metals for installation, even if they are not inflatable, that is if their final operational geometry is not defined by the pressure differential between the interior and exterior fluid.

Strength can be a desirable property for some membrane heat exchangers 100, as a stronger material does not need to be as thick, leading to cost savings and slightly improved thermal transfer. In various embodiments, strong polymers are also the least flexible polymers, and while strength is desired, so is flexibility. Flexibility can improve with thin materials, so in some embodiments, a strong but stiff polymer can be thin enough in one of these heat exchangers to be appropriately flexible. Materials selection can involve balancing the strength and flexibility of the material with the interrelated geometric constraints, including thickness, imposed by the heat exchanger design. In various embodiments, it can be desirable to apply one or more resins to a polymer heat exchanger. Additionally, introduction of additives to a polymer and/or resin can improve lifetime, conductivity, and processability, and the like.

In one preferred embodiment, a heat exchanger can comprise polyethylene terephthalate, (PET, Mylar). In another preferred embodiment, a heat exchanger can comprise high density polyethylene (HDPE), which can be formulated for long lifetimes outdoors. In one embodiment, HDPE can be cross-linked to form PEX, which has improved creep properties over other materials but otherwise retains the strength and flex properties of HDPE.

While various polymers can be quite robust, they can be substantially weakened by creep, and environmental exposure can further weaken or embrittle materials. UV and abrasive particle exposure are potentially detrimental to the heat exchanger, but such exposures can, at least in part, be dealt with through design. For example, the entire device can potentially be built in a light-proof enclosure.

Materials for use in a polymer heat exchanger can be further optimized for welding and/or to withstand the constant stress that a pressurized heat exchanger can experience. Polymer creep can be minimized in some embodiments through appropriate resin selection, polymer cross-linking after welding, additional material structure such as reinforcing fibers, ribs, or supporting scaffolding or the like.

Fouling can be minimized in some embodiments through the use of salt water, chlorinated water, or another liquid. The chemical resistance of many polymers allows for a range of fluid and additive options. The chemical resistance of some polymers can allow maintenance procedures where the fluid system is flushed to clean out any fouling that has occurred.

While fouling can suggest biological growth, precipitation, or corrosion occurring at an interface with a liquid, it is also possible to have airborne material foul the surface on the air-side of the heat exchanger. Material deposition and sticking at the heat exchange surface with air is likely controlled by the surface chemistry of the polymer, something that can be controlled through both materials selection and processing. Additionally, as with the liquid-polymer interface, the robustness of the polymer will allow a number of cleaning options to be explored if it is determined that fouling of the air-polymer surface meaningfully decreases performance.

In various embodiments, a shape changing heat exchanger 100 can be desirable for application to spaces where application of a conventional rigid heat exchanger would be impossible or impractical. For example, turning to FIGS. 9*a-c* a duct 900, it can be desirable to apply a heat exchanger to a duct 900 that has a cylindrical body 901 that extends between a first and second end 902, 903, with the body 901 defining a duct cavity 905.

Figure 9A:
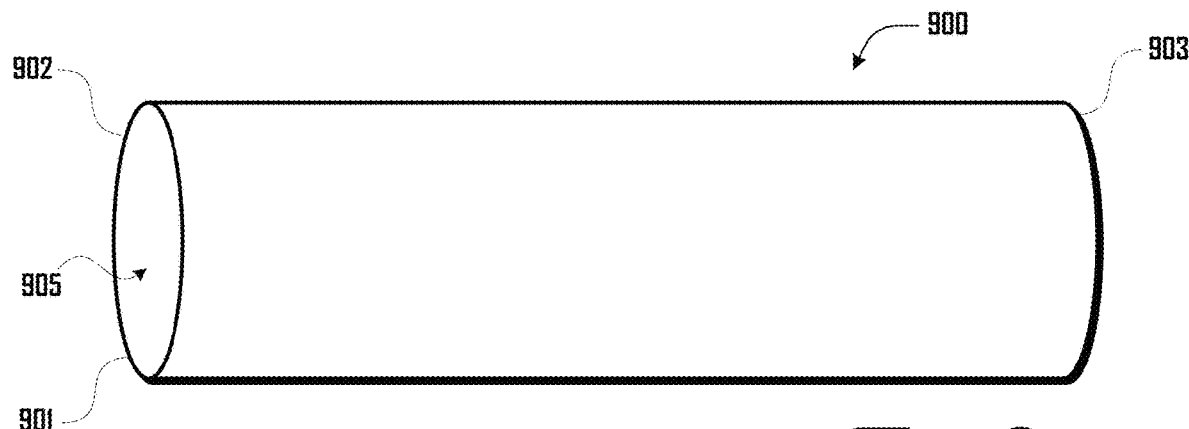
FIG. 9a illustrates a duct that has a cylindrical body extending between a first and second end with the body defining a duct cavity.
Figure 9B:
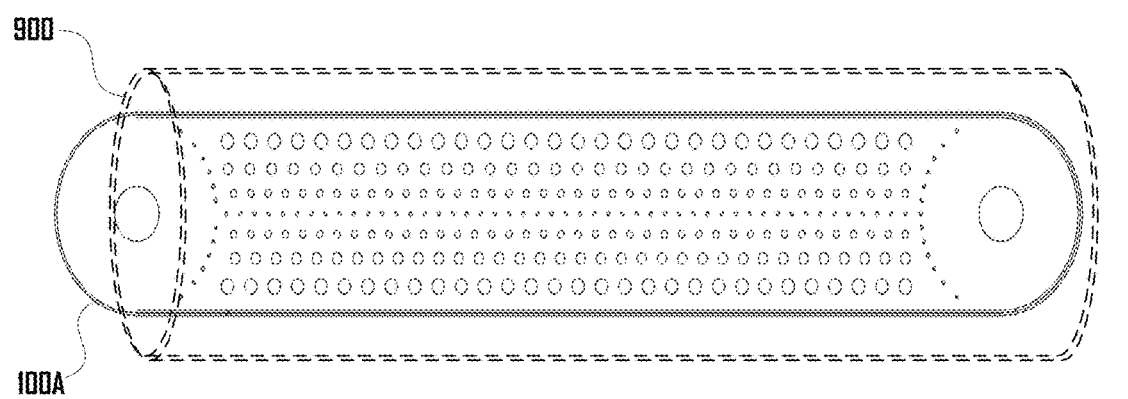
FIG. 9b illustrates the heat exchanger of FIGS. 1 and 2 inserted into the cavity of the duct of FIG. 9a at the first end while the heat exchanger is in a flat configuration.
Figure 9C:
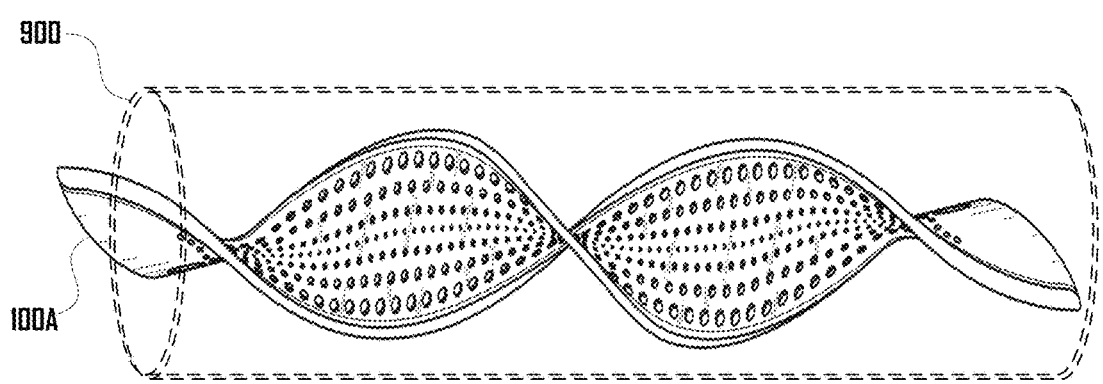
FIG. 9c illustrates the heat exchanger of FIG. 9b inflated with fluid to generate a spiral or helical configuration in the heat exchanger.

As shown in FIG. 9*b*, the heat exchanger 100A shown in FIGS. 1 and 2 can be inserted into the cavity 905 of duct 900 at the first end 902 while the heat exchanger 100 in a flat configuration as shown in FIG. 1. As shown in FIG. 9*c*, the heat exchanger 100 can then be inflated with fluid to generate a spiral or helical configuration in the heat exchanger 100. In various embodiments, such a spiral or helical configuration of the heat exchanger 100 can be desirable because it can provide for improved mixing of fluid in the duct 900, improved fluid flow within the duct 900, improved heat exchange between fluid in the duct 900 and the heat exchanger 900 and the like.

Additionally, while a simple example of a duct is shown in FIGS. 9*a-c* further embodiment can comprise a duct 900 of any suitable size, shape and length. Also, such a duct 900 can be part of various suitable duct systems, such as an HVAC system, a vehicle exhaust or cooling system, a water supply or dump line, or the like. Such a duct 900 or duct system can be linear or comprise various bends, convolutions, curves, spirals, changes in size, changes in shape or the like, and having a heat exchanger 100 capable of assuming a helical or spiral shapes can allow such a heat exchanger to pass through such features in ducts 900 with the outside of the spiral of the heat exchanger remaining the same length as if it were a straight tube, meaning that the same generic spiral or helix shape of a conformal heat exchanger 100 can be configured to fit into any arbitrary duct path with bends over minimum radius.

In other words, in various embodiments a heat exchanger 100 can adapt to various known or unknown shapes and sizes of ducts 900 or duct systems given the conforming nature of the heat exchanger 100. This can be desirable for allowing a mass produced heat exchanger 100 to be used in various ducts 900 or duct systems without having to construct a specialized heat exchanger 100 or each unique shape and size of a given duct 900 or duct system. In further examples, such a heat exchanger 100 can be desirable for temporary use in various ducts 900 or duct systems, with the heat exchanger being capable of being inserted into and used in ducts 900 or duct systems of different sizes and shapes.

Additionally, a first fluid in the duct 900 and a flow of a second fluid inside the conformal heat exchanger 100 can result in good heat transfer between the two fluids that is integrated into the duct space 905, making more efficient use of the total space available for a system which requires heat transfer. In various examples, such a first and second fluid can be any suitable fluid, including the first and second fluid both being a liquid; both the first and second fluid being a gas; the first fluid being a gas and the second fluid being a liquid; and the first fluid being a liquid and the second fluid being a gas. The first and second fluids can be different fluids or the same fluid in some examples.

Also, in various embodiments, a first fluid in the duct 900 can have a flow, whereas in other embodiments, the first fluid may not have a flow or can have a very low flow rate. In some examples, the heat exchanger 100 can be inflated and deflated to change configuration (e.g., between flat and spiral) to generate a flow in the first fluid; to generate mixing of the first fluid; or to promote heat exchange between the first and second fluid.

A flow of the second fluid within the cavity 110 of the heat exchanger 100 can be generated via a fluid source that is connected to at least one end 111 of the heat exchanger 100 such at the second fluid can enter the cavity 110 of the heat exchanger via a first port 120 and leave the heat exchanger via a second port 120. As shown in the example embodiment 100A of FIGS. 1, 2, 9*b* and 9*c*, the ports 120 can be disposed on opposing sides of the heat exchanger 100A such that the second fluid generally travels along axis X of the heat exchanger 100A in from a first port 120 and out a second port 120 on the opposite end of the heat exchanger 100A.

In some embodiments, the an inlet line from the fluid source can be coupled to a first port 120 and an outlet line can be coupled to second port 120 or the second port can simply be open. Using the example of FIGS. 2*a-c*, such an inlet line can be proximate to and/or enter the first end 902 of the duct and the outlet line can exit or be proximate to the second end 903 of the duct 900. In some examples, the second port 120 can be open and dump second fluid from the cavity 110 of the heat exchanger 100 into the duct 900. Also, while the examples of FIGS. 9*a-c* illustrate a first and second end 902, 903 of a duct being terminal ends that are open, in various embodiments the ends 902, 903 can simply be ends of a portion of a duct and need not be terminal ends and may or may not be open ends.

In further embodiments, where a second end 903 of a duct is not open, accessible or otherwise capable of having an outlet line extend from a second end of the duct 900, an outlet line can extend back to the first end 902 of the duct, either as a line that is separate from or integral to heat exchanger 100. In some embodiments, the heat exchanger 100 can be configured to generate a flow of the second fluid within the cavity 110 of the heat exchanger 100 such that the second fluid enters and exits the cavity at the same side of the heat exchanger. For example, FIG. 5a illustrates an example 100D of a heat exchanger where the second fluid can enter and exit the cavity 100 on the same side of the heat exchanger 100. For example, the ends 111 that define the ports 120 can be on the same side of the heat exchanger 100. Accordingly, the example of FIGS. 9a-c should not be construed to be limiting on the wide variety of configurations of heat exchangers 100 that are within the scope and spirit of the disclosure, which can be configured for use within a duct, pipe, cavity or the like.

In various embodiments, an inflatable heat exchanger 100 can be configured to be small in terms of volume/size when not inflated with fluid, but can be large when inflated with fluid. This can be accomplished, for example, by constructing a manifold that is collapsible (e.g., like an accordion or a bellows), and with sheets that are configured to lie flat when not inflated. The pressurization of the heat exchanger 100 can then cause the accordion-like manifold to extend out, separating the tubes and/or sheets, thus allowing fluid passage between them. Similarly, the flattened tubes or sheets can also inflate in order to allow fluid to pass through the interior of them.

For example, FIGS. 10a and 10b illustrate an example embodiment 100G of a heat exchanger 100 configured to expand and collapse via one or more manifold 1010. More specifically, FIG. 10a illustrates the heat exchanger 100G in a collapsed configuration and FIG. 10b illustrates the heat exchanger 100G in an expanded configuration where the manifold 1010 expands along an axis Z via bellows 1015 in response to fluid being introduced into the cavity 110 of the heat exchanger 100G with the fluid entering the cavity at a first port 120A and flowing through a plurality of expandable channels 1020 and leaving the cavity 110 via a second port 120B as shown by the arrows in the figure. The manifold 1010, including the channels 1020 can be defined by a plurality of internal sidewalls 1025 and/or one of the sheets 115 on opposing sides of the heat exchanger 100G.

The internal sidewalls 1025 can define a plurality of internal passages 1030. For example, the internal passages 1030 can extend through the heat exchanger 100G from opposing sides (e.g., along an axis Y that is perpendicular to axes X and Z). The internal passages 1030 can be desirable for providing additional surface area for heat transfer between a first fluid within the cavity 110 of the heat exchanger 100G and a second fluid surrounding the heat exchanger 100G including the second fluid in contact with the sheets 115, the internal sidewalls 1025 within the passages 1030, the bellows 1015, and the like. In some embodiments (e.g., as shown in FIGS. 10a and 10b), the passages 1030 can be closed in the collapsed configuration as shown in FIG. 10a and the passages 1030 can be open in the expanded configuration of FIG. 10b.

Additionally, a first and second conduit 1035A, 1035B can be disposed on opposing sides of the manifold 1010 and can communicate with the ports 120 and the channels 1020. For example, fluid can enter the first port 120A and flow into the first conduit 1035A and into the channels 1020 of the manifold 1010. The fluid can flow through the manifold 1020 and to the second conduit 1035B, where the fluid can leave the cavity 110 of the heat exchanger 100G via the second port 120B.

As shown in FIGS. 10a and 10b, the heat exchanger 100G can be configured to expand along axis Z via the bellows 1015 and expanding manifold 1010. However, while the heat exchanger 100G can be extensible along axis Z, in various embodiments, the heat exchanger 100G can be inextensible along other axes such as axis X and/or axis Y, which are perpendicular to each other and to axis Z. Also, various portions of the heat exchanger 100G can be rigid or flexible. For example, in some embodiment, the sheets 115 and/or internal sidewalls 1025 can be rigid.

One example application of such a heat exchanger 100G is a collapsible air conditioner. For example, in some implementations, a considerable fraction of the total volume of conventional air conditioners is the volume of heat exchangers that occupies a large static volume or space, which can make conventional air conditioners large and cumbersome. However, if heat exchangers of an air conditioning system are configured to occupy a small volume when not filled with fluid, the physical size of such an air conditioner system can be made smaller for at least transportation and installation, and such a system can be configured to inflate to full size during commissioning and operation. Accordingly, the example heat exchanger 100G of FIGS. 10a and 10b, or any other heat exchanger 100 as shown or described herein can be used in a collapsible heat exchange system such as in an air conditioner.

Further embodiments can enable heat exchangers 100 in spaces that can change over time or where physical space constraints are not known when the heat exchanger 100 is being constructed or configured. For example, a conformal heat exchanger can be made to be a part of an article of clothing or a piece of fabric used as insulation or a non-rigid physical container like a bag. To accomplish this, in some embodiments, two sheets 115 of flexible polymer film can be welded together to create a heat exchanger 100 and the heat exchanger 100 can be attached (e.g., with an adhesive, or other suitable coupling) to the interior surface of an insulated bag. By pumping temperature-controlled fluid through such a conformal heat exchanger 100, the insulated bag itself can become temperature controlled and can be used like a refrigerator or freezer. Such a system can have the benefit of performing as an insulated bag that can be transported with small volume or that only has the minimum interior volume necessary to hold its contents, which can reduce the volume that needs to be cooled and thus can reduce the energy requirements of cooling.

The described embodiments are susceptible to various modifications and alternative forms, and specific examples thereof have been shown by way of example in the drawings and are herein described in detail. It should be understood, however, that the described embodiments are not to be limited to the particular forms or methods disclosed but, to the contrary, the present disclosure is to cover all modifications, equivalents, and alternatives.

What is claimed is:

1. A method of making and operating a duct heat exchanger, the method comprising:
   constructing an elongated planar membrane heat exchanger by coupling a first planar polymer sheet to a second planar polymer sheet at least by a welded seam to form at least one fluid chamber defined by the first and second polymer sheet and the seam and a first and second end that respectively communicate with a first and second port defined by at least one of the first and second sheet, the membrane heat exchanger configured to have a flat configuration when fluid is not present within the fluid chamber and configured to have a helical configuration when fluid is present within the fluid chamber, the membrane heat exchanger comprising a plurality of internal couplings disposed in columns that extend parallel to a central axis X of the membrane heat exchanger, with the internal couplings of respective columns becoming increasingly smaller from a peripheral edge of the membrane heat exchanger toward the central axis X and the membrane heat exchanger having symmetry about the central axis X;

inserting the elongated planar membrane heat exchanger into a duct chamber of a duct at a first end of the duct so that the elongated planar membrane heat exchanger extends from the from the first end of the duct to a second end of the duct, the first end of the membrane heat exchanger disposed at the first end of the duct and the second end of the membrane heat exchanger disposed at the second end of the duct, the membrane heat exchanger being inserted while the membrane heat exchanger is in the flat configuration;

introducing a first fluid into the fluid chamber of the membrane heat exchanger to change the membrane heat exchanger from the flat configuration to the helical configuration while the membrane heat exchanger is disposed within the duct chamber; and generating a fluid flow of the first fluid within the fluid chamber of the membrane heat exchanger between the first and second ends of the membrane heat exchanger, the first fluid generating heat exchange with a second fluid disposed within the duct chamber, the fluid flow including the first fluid entering the fluid chamber of the membrane heat exchanger at the first end of the membrane heat exchanger having a first temperature, and the first fluid leaving the fluid chamber of the membrane heat exchanger at the second end of the membrane heat exchanger having a second temperature that is different from the first temperature.

2. The method of claim 1, wherein the first fluid within fluid chamber of the membrane heat exchanger is a liquid and the second fluid within the duct chamber is a gas.

3. The method of claim 1, wherein the first temperature is lower than the second temperature and the heat exchange between the first and second fluid results in cooling of the second fluid within the duct chamber.

4. A method of making and operating duct heat exchanger, the method comprising:

inserting an elongated membrane heat exchanger into a duct chamber of a duct at a first end of the duct so that the elongated membrane heat exchanger extends from the from the first end of the duct to a second end of the duct, the elongated membrane heat exchanger comprising a first and second sheet that form at least one fluid chamber defined by the first and second sheet and a first and second end that respectively communicate with a first and second port defined by at least one of the first and second sheet, the first end of the membrane heat exchanger disposed at the first end of the duct and the second end of the membrane heat exchanger disposed at the second end of the duct;

introducing a first fluid into the fluid chamber of the membrane heat exchanger to change the membrane heat exchanger from a flat configuration to a helical configuration while the membrane heat exchanger is disposed within the duct chamber; and generating a fluid flow of the first fluid within the fluid chamber of the membrane heat exchanger between the first and second ends of the membrane heat exchanger, the first fluid generating heat exchange with a second fluid disposed within the duct chamber.

5. The method of claim 4, wherein the fluid flow includes the first fluid entering the fluid chamber of the membrane heat exchanger at the first end of the membrane heat exchanger having a first temperature and the first fluid leaving the fluid chamber of the membrane heat exchanger at the second end of the membrane heat exchanger having a second temperature that is different from the first temperature.

6. The method of claim 5, wherein the first temperature is lower than the second temperature and the heat exchange between the first and second fluid results in cooling of the second fluid within the duct chamber.

7. The method of claim 4, wherein the membrane heat exchanger is configured to have the flat configuration when fluid is not present within the fluid chamber and configured to have the helical configuration when fluid is present within the fluid chamber.

8. The method of claim 4, wherein the membrane heat exchanger comprises a plurality of internal couplings that couple the first and second sheets.

9. The method of claim 8, wherein the plurality of internal couplings are disposed in columns that extend parallel to a central axis X of the membrane heat exchanger.

10. The method of claim 9, wherein the internal couplings of respective columns are increasingly smaller from a peripheral edge of the membrane heat exchanger toward the central axis X.

11. The method of claim 4, wherein the membrane heat exchanger has symmetry about a central axis X.

12. The method of claim 4, wherein the first fluid within fluid chamber of the membrane heat exchanger is a liquid and the second fluid within the duct chamber is a gas.

* * * * *